United States Patent
Katayama et al.

(10) Patent No.: US 7,404,878 B2
(45) Date of Patent: Jul. 29, 2008

(54) GAS DIFFUSION ELECTRODE ASSEMBLY, BONDING METHOD FOR GAS DIFFUSION ELECTRODES, AND ELECTROLYZER COMPRISING GAS DIFFUSION ELECTRODES

(75) Inventors: Shinji Katayama, Tamano (JP); Kiyohito Asaumi, Tamano (JP); Hiroaki Aikawa, Kawasaki (JP); Tsugiyoshi Osakabe, Nagoya (JP); Mitsuharu Hamamori, Nagoya (JP); Tatsuhito Kimura, Yokohama (JP); Koji Saiki, Toyonaka (JP); Kenji Nonomura, Kakogawa (JP); Naoya Okada, Tokuyama (JP); Osamu Ichinose, Takaishi (JP)

(73) Assignees: Chlorine Engineers Corp., Ltd., Tokyo (JP); Tosoh Corporation, Yamaguchi (JP); Mitsui Chemicals, Inc., Tokyo (JP); Toagosei Co., Ltd., Tokyo (JP); Kaneka Corporation, Osaka (JP); Asahi Glass Company, Limited, Tokyo (JP); Asahi Kasei Chemicals Corporation, Tokyo (JP); Daiso Co., Ltd., Osaka (JP); Tokuyama Corporation, Yamaguchi (JP)

( * ) Notice: Subject to any disclaimer, the term of this patent is extended or adjusted under 35 U.S.C. 154(b) by 524 days.

(21) Appl. No.: 10/812,422

(22) Filed: Mar. 30, 2004

(65) Prior Publication Data

US 2004/0256223 A1    Dec. 23, 2004

(30) Foreign Application Priority Data

| Mar. 31, 2003 | (JP) | 2003-093992 |
| Mar. 31, 2003 | (JP) | 2003-093993 |
| May 22, 2003 | (JP) | 2003-145088 |
| May 30, 2003 | (JP) | 2003-154996 |

(51) Int. Cl.
*C25B 11/03* (2006.01)
(52) U.S. Cl. ............... 204/283; 204/284; 429/32; 429/40; 429/44
(58) Field of Classification Search ........... 204/284, 204/283; 429/32, 40, 44
See application file for complete search history.

(56) References Cited

U.S. PATENT DOCUMENTS 4,663,013 A    5/1987    Kumagai et al.

(Continued)

FOREIGN PATENT DOCUMENTS

JP    58-204030 A    11/1983

(Continued)

OTHER PUBLICATIONS

Partial European Search Report dated Dec. 27, 2006, issued in corresponding European patent application No. 04 00 7850.3.

(Continued)

*Primary Examiner*—Bruce F Bell
(74) *Attorney, Agent, or Firm*—Westerman, Hattori, Daniels & Adrian, LLP.

(57) ABSTRACT

In a gas diffusion electrode assembly, and in an electrolyzer using the same, a bonding piece having on at least one surface a perfluorosulfonic acid layer, a perfluorosulfonyl fluoride layer or an alkyl ester of perfluorocarboxylic acid layer is positioned at its perfluoro compound layer surface with respect to the gas diffusion electrode assembly. Adjacent gas diffusion electrodes are heat fusion bonded together, or heat fusion bonding is carried out using the bonding piece in a frame form. Adjacent gas diffusion electrodes are sealed up by heat fusion bonding, using a material that is similar to the material that forms the gas diffusion electrodes.

2 Claims, 11 Drawing Sheets

U.S. PATENT DOCUMENTS

| | | | |
|---|---|---|---|
| 6,054,228 A * | 4/2000 | Cisar et al. | 429/18 |
| 6,372,102 B1 * | 4/2002 | Sakata et al. | 204/283 |
| 6,423,194 B1 * | 7/2002 | Furuya | 204/284 |
| 7,195,690 B2 * | 3/2007 | Mekala et al. | 156/263 |
| 2004/0038808 A1 * | 2/2004 | Hampden-Smith et al. | 502/180 |
| 2004/0101739 A1 * | 5/2004 | Enjoji et al. | 429/40 |

FOREIGN PATENT DOCUMENTS

| | | |
|---|---|---|
| JP | 2000-119880 A | 4/2000 |
| JP | 2000-199094 A | 7/2000 |
| JP | 2000-239879 A | 9/2000 |
| JP | 2002-239881 A | 9/2000 |
| JP | 2000-273679 A | 10/2000 |

OTHER PUBLICATIONS

Japanese Office Action dated Sep. 28, 2007 (mailing date), issued in corresponding Japanese Patent Application No. 2003-093992.

* cited by examiner

Fig. 4
(A)
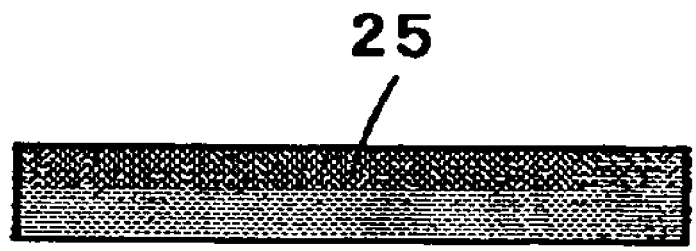
(B)
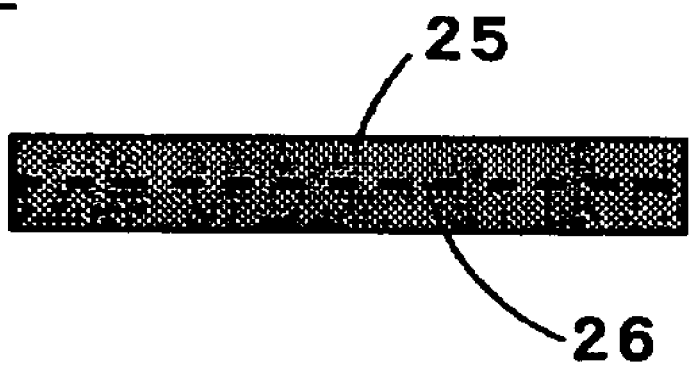
(C)
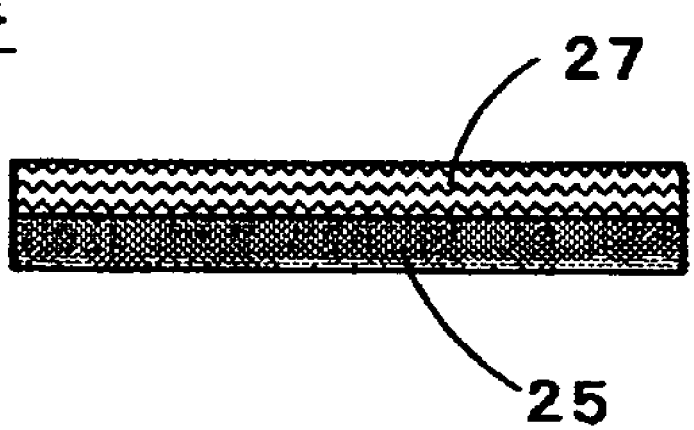

Fig. 9
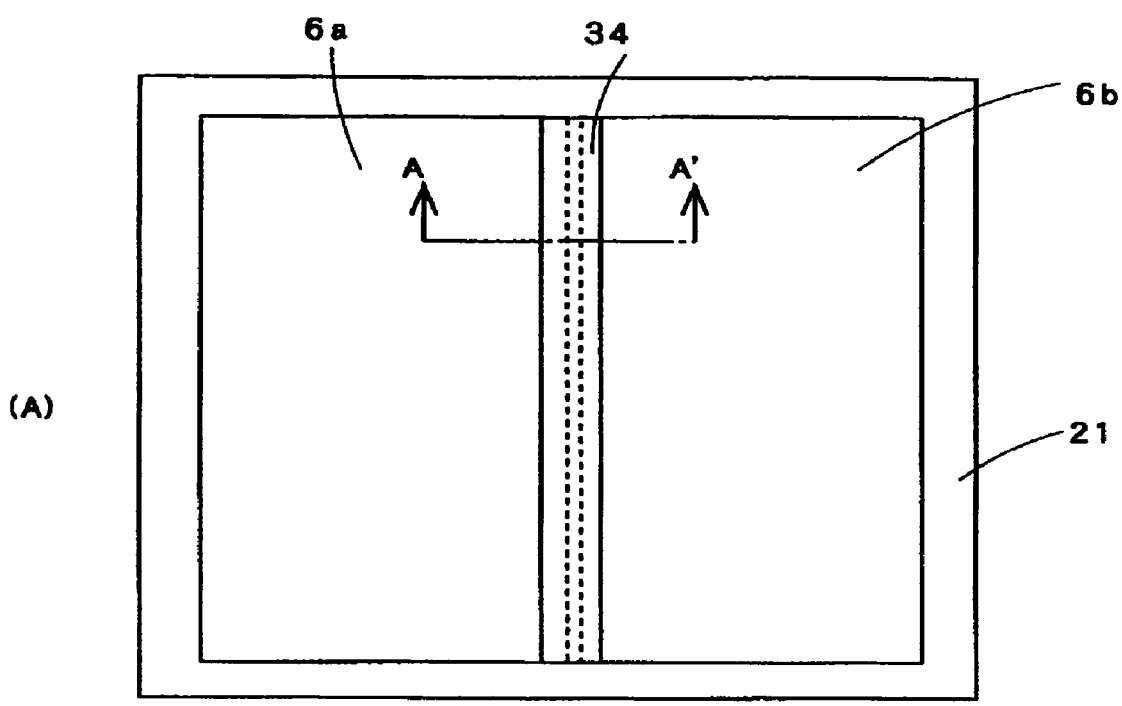
(A)
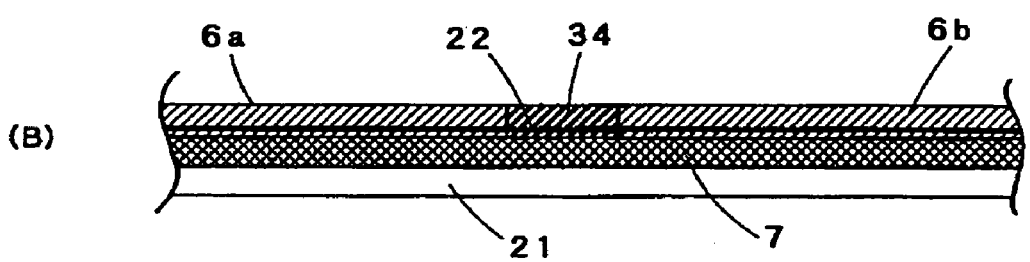
(B)

GAS DIFFUSION ELECTRODE ASSEMBLY, BONDING METHOD FOR GAS DIFFUSION ELECTRODES, AND ELECTROLYZER COMPRISING GAS DIFFUSION ELECTRODES

BACKGROUND OF THE INVENTION

The present invention relates generally to a gas diffusion electrode assembly and a bonding method for gas diffusion electrodes, and more particularly to a bonding method for gas diffusion electrodes to build up a gas diffusion electrode assembly having a large electrode area and an electrolyzer comprising gas diffusion electrodes.

Aqueous solutions are electrolyzed to produce various materials while hydrogen is generated at cathodes in general. Hydrogen generated by electrolysis is higher in purity than that obtained by other means. In applications where their main purpose is not to obtain hydrogen, however, it is proposed to avoid generation of hydrogen to lower electrolysis voltage, thereby driving down power per electrolytic reaction.

That is, when oxygen gas diffusion electrodes are used as cathodes in place of general hydrogen generation electrodes, it is possible to achieve a 1.2 V drop of electrolysis voltage because hydrogen is not generated at the cathodes. With the gas diffusion electrodes, accordingly, the electrical energy necessary for electrolysis can be saved. Thus, electrolysis harnessing oxygen gas diffusion electrodes as cathodes is extremely effective at plants with no condition for efficient use of hydrogen.

To prevent generation of hydrogen at cathodes thereby stepping down electrolysis voltage, there has been proposed an electrolysis process where oxygen is fed to an oxygen gas diffusion electrode placed at a cathode.

Creating a gas-liquid-solid three-phase interface at a reaction layer site, a gas diffusion electrode is now produced by forming a composition comprising a hydrophobic synthetic resin such as fluororesin, a catalyst, an electrically conductive substance, etc., or sintering the resultant formed product.

On the other hand, industrially available aqueous solution electrolyzers represented by ion-exchange membrane electrolyzers for brine are becoming larger and larger, and with this an electrode area of as large as a few $m^2$ is being employed.

On such a large electrolyzer a gas diffusion electrode having a large area must be mounted. However, it is cumbersome to produce a large-area gas diffusion electrode. Made of a composition comprising fluororesins, electrically conductive substances, etc., a gas diffusion electrode is of low mechanical strength, and as area increases, it tends to undergo deformation due to its own weight, and is difficult to work with as well.

To produce an electrolyzer having a large electrode area, a number of gas diffusion electrodes, each having a small area, must be provided. In this case, they must be bonded together in such a way as to ensure prevention of leakage of electrolytes and gases through junctions at which they are bonded.

However, gas diffusion electrodes are made of a composition comprising an electrically conductive material such as carbon black and a fluororesin, and so are just only poor in adhesion to other member but lacking in strength as well. It is thus impossible to bond or fix them together with large force, offering a problem with reliable bonding.

For instance, any sufficient bonding strength could never be obtained by use of fluororesins such as polytetrafluoroethylene. On the other hand, tetrafluoroethylene-hexafluoropropylene copolymers (FEPs) are known as fluororesins having much the same heat fusion bonding properties as general-purpose thermoplastic resins. Gas diffusion electrodes may be bonded together by heat fusion bonding of an EFT film placed on a junction between them. However, even when a thin FEP film is used, the heat fusion bonded junction often warps up in a concave form toward the FEP side. Such an irregular bonded surface may induce stress in the vicinity of the junction and do damage thereto, or render it difficult to mount the gas diffusion electrodes on an electrolyzer.

Projections from the warping junction may do damage to ion-exchange membrane surfaces.

To produce an electrolyzer having a large electrode area, a number of gas diffusion electrodes, each having a small area, must be provided as described above. In this case, they must be bonded together in such a way as to ensure prevention of leakage of electrolytes and gases through junctions at which they are bonded together.

For instance, JP(A) 2000239881 proposes an electrolzyer comprising a number of gas diffusion electrodes, wherein they are bonded by hot pressing to two or more openings provided in a corrosion-resistant metal frame via a silver sheet for the purpose of ensuring prevention of electrolytes and gases.

However, a problem with hot pressing of fluoro-resin-containing gas diffusion electrodes is that any sufficient bonding properties are not obtained at their junctions with a metal sheet.

Currents are conducted through a gas diffusion electrode by connecting a portion (that serves as an electrically conductive connector of the gas diffusion electrode) of a collector drawn out of its gas supply layer in which the collector is embedded with a cathode pan that also serves as a cathode chamber collector, so that the collector can be electrically connected to the cathode pan.

A junction of the collector in the gas diffusion electrode with the cathode pan must be of low electrical resistance, and fully sealed up in such a way as to prevent leakage of electrolyte, etc. through that junction.

To an industrially used electrolyzer of as large as 1 m×1 m or more, a plurality of gas diffusion electrode units having a width of, for instance, about 30 cm are often bonded and attached in a divided fashion in consideration of difficulty with which a large-area gas diffusion electrode is produced, electrically conductive connection with a cathode pan or the like. Even such gas diffusion electrode units are bonded to the electrolyzer, the junctions must be of reduced electrical resistance, and be sealed up in such a way as to prevent leakage of electrolytes.

For instance, JP(A) 2000119880 comes up with an attachment method for such gas diffusion electrodes, wherein electrical conductors mounted on the gas diffusion electrodes are inserted in a groove in a cathode collector frame with wedges embedded therein, thereby bringing the cathode collector frame in contact with the gas diffusion electrodes.

JP(A) 2000199094 proposes a method for prevention of penetration of electrolytes, wherein collectors exposed on the peripheries of gas diffusion electrodes are welded to a cathode collector frame at junctions, and the junctions are sealed up with a sealing agent.

JP(A) 2000273679 puts forward a sealing method for gas diffusion electrodes wherein polytetrafluoroethylene (PTFE) fine powders are filled in junctions of the gas diffusion electrodes and the junctions are sealed up by ultrasonic fusion bonding, or a bonding method for gas diffusion electrodes wherein the gas diffusion electrodes are bonded together using as an adhesive a solution of polyethersulfone resin in an organic solvent.

JP(A) 2000239879 proposes a method wherein a cathode pan is bonded to resin sheets hot-pressed to gas diffusion electrodes.

One object of the present invention is to provide a bonding method for gas diffusion electrodes. Another object of the invention is to provide a gas diffusion electrode assembly that can be attached to an electrolyzer having a large electrode area with junctions having improved airtightness.

Yet another object of the invention is to provide an electrolyzer having a large electrode area. A further object of the invention is to provide an electrolyzer having a large electrode area, which, upon assembled, is less likely to suffer from leakage of electrolytes and gases through joints of a plurality of gas diffusion electrodes mounted on an electrolytic surface.

A further object of the invention is to provide a sealing method for gas diffusion electrodes, which ensures reliable prevention of liquid leakage and in which junctions of the gas diffusion electrodes are of low electrical resistance, and the junctions can not only be used as mere junction areas but also can be effectively used as electrodes.

BRIEF DESCIPTION OF THE DRAWINGS

FIG. 1 is illustrative of one embodiment of an ion-exchange membrane electrolyzer comprising gas diffusion electrode.

FIGS. 2(A) and 2(B) are illustrative of gas diffusion electrodes bonded together according to the bonding method of the invention.

FIGS. 3(A) and 3(B) are illustrative of gas diffusion electrodes bonded together according to the bonding method of the invention.

FIGS. 4(A), 4(B) and 4(C) are illustrative in section of the bonding pieces used for bonding gas diffusion electrodes together according to the invention.

FIGS. 5(A) and 5(B) are plan views of the cathode chamber in the electrolyzer comprising gas diffusion electrodes according to the invention, as viewed from the reactive layer side on the gas diffusion electrode side.

FIGS. 6(A), 6(B), 6(C) and 6(D) are illustrative in section of the bonding pieces used for bonding gas diffusion electrodes together according to the invention.

FIGS. 7(A) and 7(B) are illustrative in partial section of one embodiment of the sealing method for gas diffusion electrodes according to the invention.

FIGS. 8(A) and 8(B) are illustrative in partial section of another embodiment of the sealing method for gas diffusion electrodes-according to the invention.

FIGS. 9(A) and 9(B) are illustrative in partial action of yet another embodiment of the sealing method for gas diffusion electrodes according to the invention.

SUMMARY OF THE INVENTION

Figure 1:
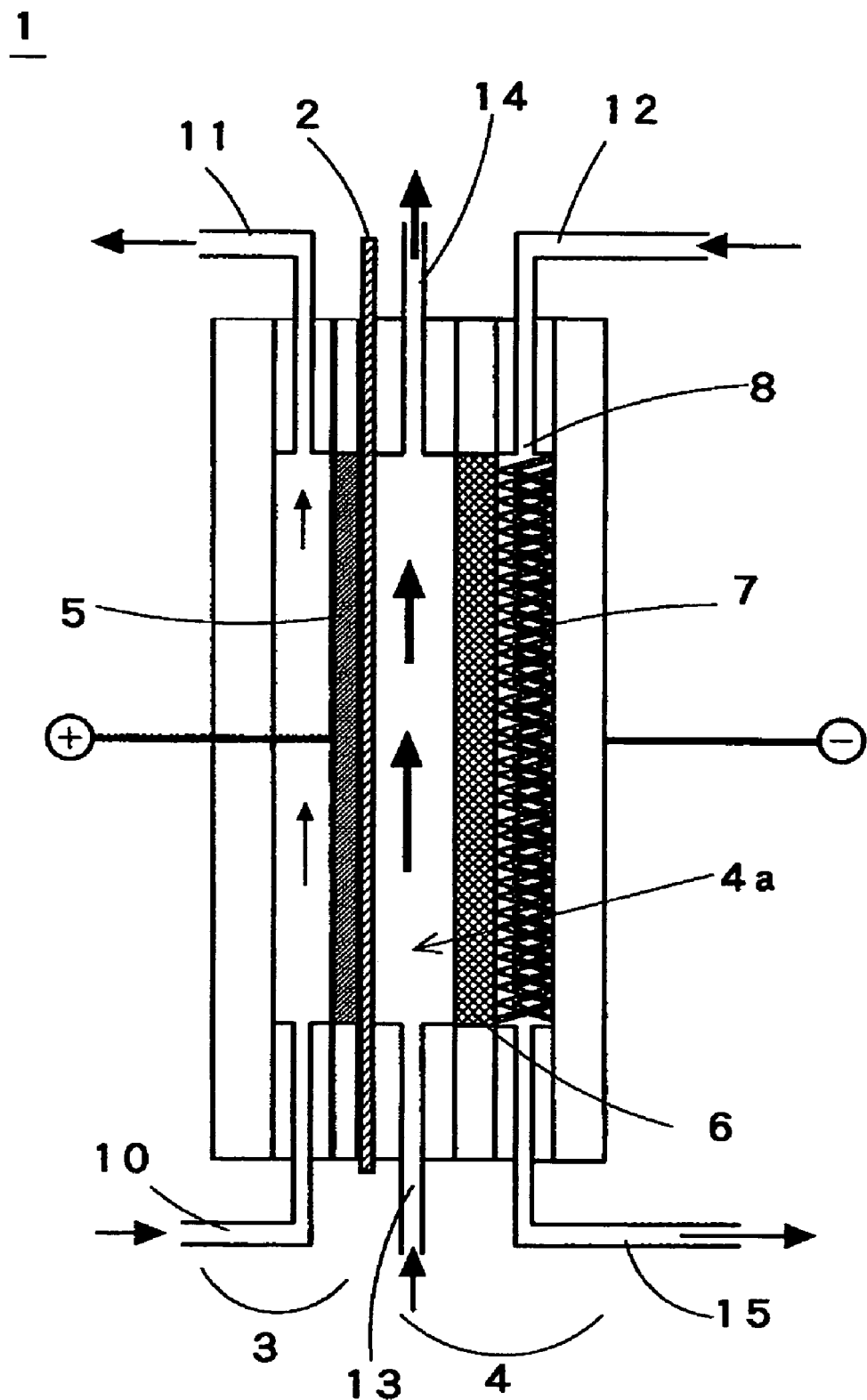

The present invention provides a gas diffusion electrode assembly comprising a plurality of gas diffusion electrodes, wherein a bonding piece having on at least one surface a perfluorosulfonic acid layer, a perfluorosulfonyl fluoride layer or an alkyl ester of perfluorocarboxylic acid layer is placed at said perfluoro compound layer surface with respect to adjacent gas diffusion electrodes to bond said adjacent gas diffusion electrodes together by heat fusion bonding.

The invention provides a bonding method for a gas diffusion electrode assembly comprising a plurality of gas diffusion electrodes, wherein a bonding piece having on at least one surface a perfluorosulfonic acid layer, a perfluorosulfonyl fluoride layer or an alkyl ester of perfluorocarboxylic acid layer is placed at said perfluoro compound layer surface with respect to both adjacent gas diffusion electrodes to bond the respective gas diffusion electrodes to said bonding piece by heat fusion bonding.

The invention provides a bonding method for a gas diffusion electrode assembly, wherein a covering sheet is covered on a junction where gas diffusion electrodes are bonded together, and an adhesive composition containing a corrosion-resistant synthetic resin is coated on said covering sheet for bonding.

In the bonding method for a gas diffusion electrode assembly, it is preferable that either one of the surface of said junction to be bonded to said covering sheet and the surface of said covering sheet to be bonded to said junction is previously impregnated with a corrosion-resistant synthetic resin-containing solution having a synthetic resin concentration lower than that of said adhesive composition containing a corrosion-resistant synthetic resin.

In the bonding method for a gas diffusion electrode assembly, it is preferable that a filling agent is filled in a gap formed between said gas diffusion electrodes and said covering sheet.

In the bonding method for a gas diffusion electrode assembly, it is preferable that said covering sheet is microporous on at least the surface thereof.

In the bonding method for a gas diffusion electrode assembly, it is preferable that said corrosion-resistant synthetic resin is a homopolymer or copolymer of tetrafluoroethylene.

The invention provides an electrolyzer comprising a gas diffusion electrode assembly, wherein the periphery of an electrode surface opposite to the opposite polarity side of said gas diffusion electrode assembly is airtightly bonded to a frame form of bonding member, the surface of a junction of at least a bonding frame of said frame form of bonding member with said gas diffusion electrode assembly is provided with a perfluorosulfonic acid layer, a perfluorosulfonyl fluoride layer or an alkyl ester of perfluorocarboxylic acid layer, and the periphery of said frame form of bonding member is stacked thereon via a gasket.

In the electrolyzer comprising a gas diffusion electrode assembly, it is preferable that said frame form of bonding member is provided with a plurality of bonding frame blocks, to each of which a gas diffusion electrode is bonded.

In the electrolzyer comprising a gas diffusion electrode assembly, it is preferable that said frame form of bonding member is formed in a seamless, integral manner.

The invention provides a sealing method for a gas diffusion electrode assembly, wherein a sealing material containing an electrically conductive carbonaceous material and a fluororesin is filled in a junction of gas diffusion electrodes, and said sealing material is heat treated for bonding.

In the sealing method for a gas diffusion electrode assembly, it is preferable that at said junction of gas diffusion electrodes, a collector is exposed on the periphery thereof.

In the sealing method for a gas diffusion electrode assembly, it is preferable that the sealing material containing an electrically conductive carbonaceous material and a fluororesin is filled in a junction of gas diffusion electrodes while a collector provided in the gas diffusion electrodes is exposed on the periphery thereof, and said sealing material is heat treated for bonding.

In the sealing method for a gas diffusion electrode assembly, it is preferable that said sealing material is composed of the same constituent as either one of a gas supply layer of a reactive layer of the gas diffusion electrodes to be bonded together.

In the sealing method for a gas diffusion electrode assembly, it is preferable that said sealing material contains a catalyst substance in a gas diffusion electrode.

In the sealing method for a gas diffusion electrode assembly, it is preferable that the junction of a gas diffusion electrode is a junction of said gas diffusion electrode with a cathode chamber collector frame, and a gap between said gas diffusion electrode and said cathode chamber collector frame is sealed up.

In the gas sealing method for a gas diffusion electrode assembly, it is preferable that the junction of a gas diffusion electrode is a junction of said gas diffusion electrode with an adjacent gas diffusion electrode thereto, and a gap between adjacent gas diffusion electrodes is sealed up.

The invention provides a repairing method for a gas diffusion electrode, characterized in that a sealing material containing an electrically conductive carbonaceous material and a fluororesin is filled in a defective portion of said gas diffusion electrode, so that said defective portion is repaired by heat treatment of said sealing material.

DESCRIPTION OF THE PREFERRED EMBODIMENTS

According to the gas diffusion electrode assembly of the invention, it is found that a junction of high strength can be obtained by heat fusion bonding of a bonding piece having on at least one surface a perfluorosulfonic acid layer, a perfluorosulfonyl fluoride layer or an alkyl ester of perfluorocarboxylic acid layer to a gas diffusion electrode formed of a fluororesin-containing composition at its perfluoro compound surface.

Thus, the surface of the perfluorosulfonic acid layer, the perfluorosulfonyl fluoride layer or the alkyl ester of perfluorocarboxylic acid layer has good affinity for the fluororesin composition, and can yield a tough junction by heat fusion bonding, thereby ensuring stable performance even after attached to an electrolyzer.

According to the invention, it is found that a gas diffusion electrode assembly can be obtained by providing a number of gas diffusion electrode units, each having a small area, and bonding adjacent gas diffusion electrode units together by means of a bonding piece having said perfluoro compound.

In general, a gas diffusion electrode formed of fluororesins and electrically conductive substances such as carbon black is less adhesive to other substance. However, if the electrode is bonded at its periphery to a bonding frame comprising a frame-form member having on at least one surface a perfluorosulfonic acid layer, a perfluorosulfonyl fluoride layer or an alkyl ester of perfluorocarboxylic acid layer, then the junction of the bonding frame with the gas diffusion electrode can be well protected against leakage. The bonding frame with gas diffusion electrodes bonded thereto is formed of a synthetic resin, and so when such bonding frames are stacked one upon another via gaskets to set up an electrolyzer, there is no leakage through the stacking because the bonding frames are in good contact with the gaskets.

According to the invention, a bonding frame block comprising a perfluorosulfonic acid layer, a perfluorosulfonyl fluoride layer or an alkyl ester of perfluorocarboxylic acid layer attached to a frame-form member is heat fusion bonded to the electrode surface of the gas diffusion electrode formed of a fluororesin-containing composition in a face-to-face fashion, so that a junction of high strength and excelling in sealing properties with respect to fluids can be obtained. According to the invention, it is found that an electrolyzer comprising a gas diffusion electrode assembly having a large electrode area can be assembled by providing a frame-form member comprising a plurality of bonding frame blocks and placing a gas diffusion electrode in each bonding frame block.

If a plurality of gas diffusion electrode units, each having a small area and being relatively easy to make or handle, are attached to a plurality of bonding frame blocks in place of a gas diffusion electrode having a large electrode area and involving production, handling or other problems, it is then possible to provide an electrolyzer having any desired area.

Thus, even when cathodes of some electolyzers in an electrolyzer circuit already in operation and comprising a number of electrolyzers with no gas diffusion electrodes are replaced by gas diffusion electrodes, the electrolyzer circuit can be run in the same manner.

When the frame-form member is provided in a seamless, integral manner, it is possible to assemble an electrolyzer having improved sealing properties without irregularities in association with bonding.

In the sealing method for gas diffusion electrodes according to the invention, the sealing material for bonding is selected while taking into account the material of which the reactive and gas supply layers of a gas diffusion electrode are formed. More specifically, the sealing material used is composed of an electrically conductive carbonaceous material, a fluororesin and other electrically conductive particles, preferably catalyst particles contained in the reactive layer of the gas diffusion electrode. In the sealing method of the invention, a junction is formed of a gas permeable material obtained by heat treatment of this sealing material.

A covering sheet comprising an alkali-resistant, corrosion-resistant synthetic resin is covered on the junction for bonding thereto using an adhesive composition containing a corrosion-resistant synthetic resin.

The present invention is now explained with reference to the accompanying drawings.

FIG. 1 is illustrative of one embodiment of an ion-exchange membrane electrolyzer comprising gas diffusion electrodes, viz., an electrolyzer for brine.

An ion-exchange membrane electrolyzer 1 is divided by a cation-exchange membrane 2 into an anode chamber 3 and a cathode chamber 4, with an anode 5 located within 20 the anode chamber 3. In general, the anode 5 is in close contact with the cation-exchange member 2.

For the anode 5, use may be made of an electrode wherein an electrode catalyst coating containing a platinum group metal or its metal oxide is formed on a porous support such as an expanded metal support comprising a thin film-forming metal such as titanium. The cathode chamber 4 includes a catholyte chamber 4a with a gas diffusion electrode 6 located within it.

The gas diffusion electrode 6 may be formed by laminating an electrode catalyst-containing reactive and gas diffusion layer on a cathode collector made of a metal gauze comprising an corrosion-resistant material such as stainless, nickel, and silver or an expanded metal, sintered powders, sintered metal fibers or foams.

For the electrode catalyst, metals such as platinum, palladium, ruthenium, iridium, silver and cobalt or their oxides may be used. Such an electrode catalyst may be milled with a hydrophobic material such as fluorinated graphite and fluororesin, and coated or otherwise applied to the collector to form a reactive layer.

On the back surface of the gas diffusion electrode 6 that faces away from the cation-exchange membrane 2, there is provided a porous cathode support 7 that forms a gas chamber 8.

Brine is fed as an anolyte in the anode chamber 3 through an anolyte inlet 10 formed in its bottom, where it is electrolyzed at the anode. Then, brine having a decreased concentration is discharged from the anode chamber 3 through an anolyte outlet 11 provided in its top together with chlorine generated at the anode.

An oxygen-containing gas is fed in the gas chamber 8 in the cathode chamber 4 via an oxygen-containing gas inlet 12 provided through its top, and a dilute aqueous solution of sodium hydroxide is supplied in the gas chamber 8 via a catholyte inlet 13 formed through the bottom of the catholyte chamber 4a. Sodium hydroxide is produced from hydroxide ions generated by reactions of oxygen, water and electrons at the gas diffusion electrode 6 and sodium ions arriving at the catholyte chamber through an ion-exchange membrane, and then removed from an upper catholyte outlet 14. A gas with a decreased content of oxygen is discharged from an oxygen-containing gas outlet 15.

Figure 2:
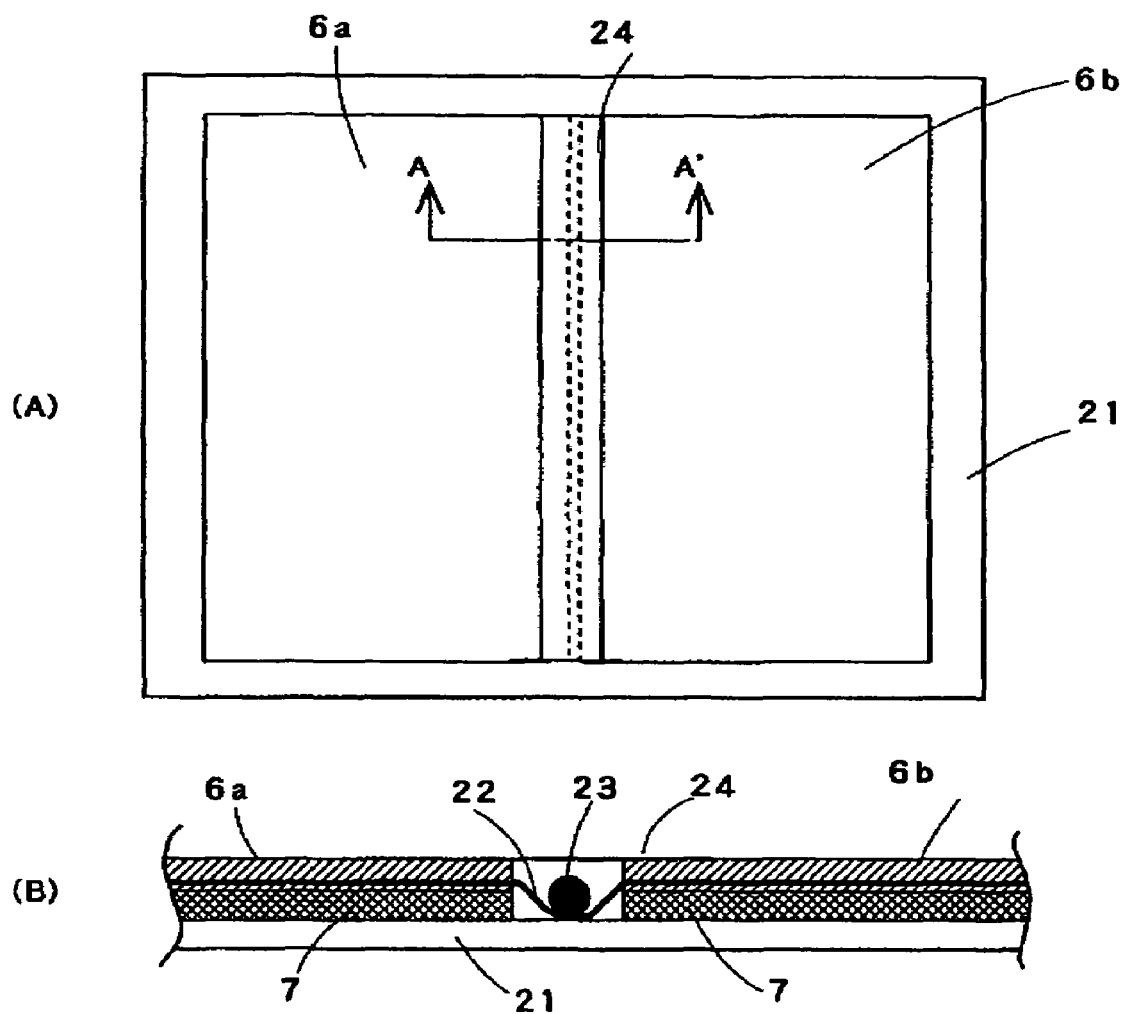

FIGS. 2(A) and 2(B) are illustrative of the gas diffusion electrodes bonded by the bonding method according to the invention. FIG. 2(A) is a plan view, and FIG. 2(B) is an enlarged section of FIG. 2(A) taken on line A-A'.

In a cathode chamber 4, two gas diffusion electrode units 6a, 6b are attached to a cathode chamber partition 21 through cathode supports 7. A collector 22 comprising a metal gauze, an expanded metal or the like and embedded in the gas diffusion electrode unit 6a is drawn out of the gas diffusion electrode unit 6a, and welded with a bonding aid member 23 to the surface of the cathode chamber partition 21 (often called the cathode pan hereinafter) to form a mechanical bond and an electrically conductive connection.

The gas diffusion electrode units 6a, 6b are provided with a perfluorosulfonic acid resin bonding piece 24 by heat fusion, thereby preventing leakage of electrolyte from a space defined between both.

A filler material may be poured in spaces between the gas diffusion electrode units 6a and 6b and between the cathode supports 7 to fix the bonding piece in place.

Figure 3:
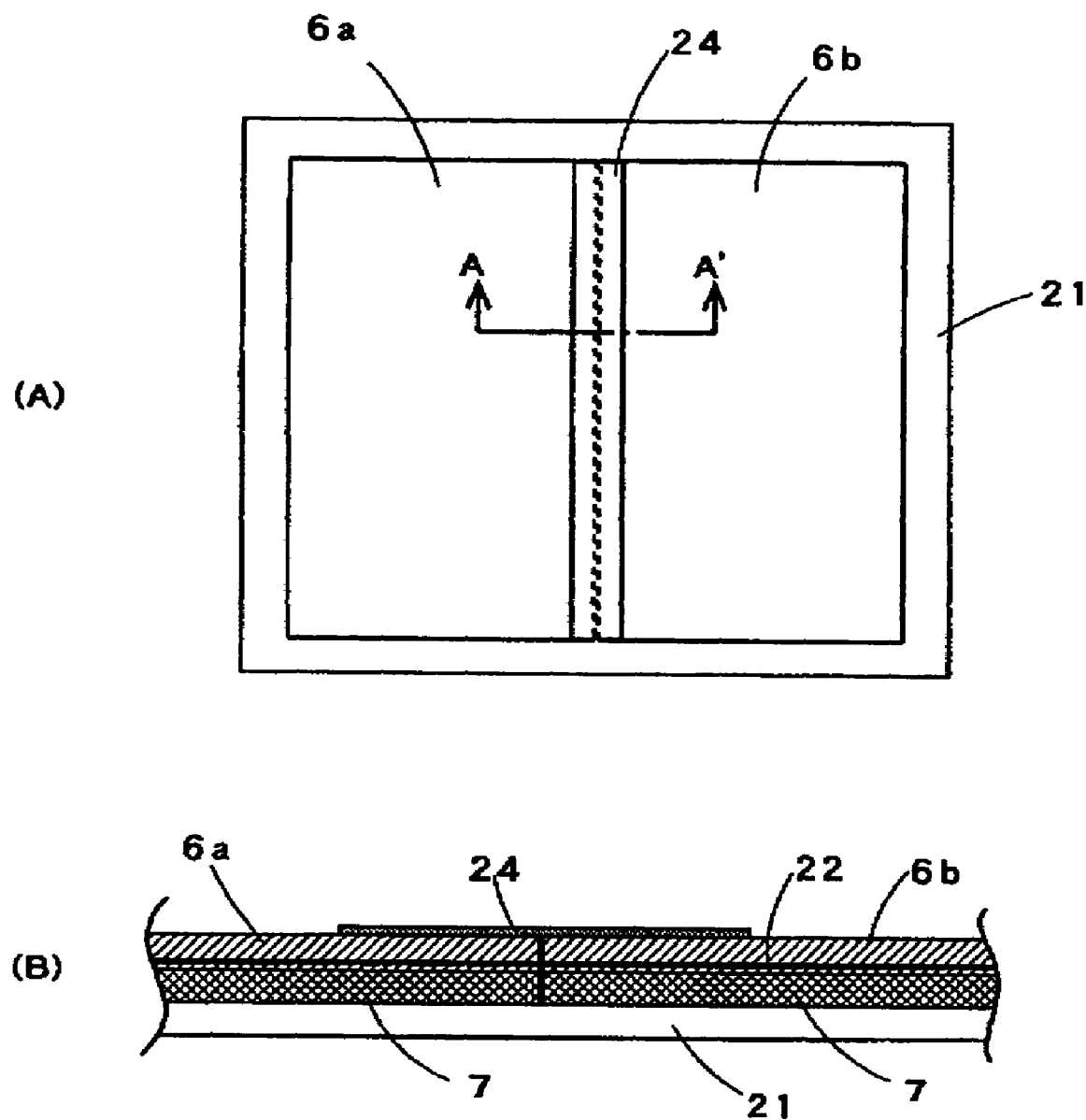

FIGS. 3(A) and 3(B) are illustrative of the gas diffusion electrodes bonded together by the bonding method according to the invention. FIG. 3(A) is a plan view, and FIG. 3(B) is an enlarged section of FIG. 3(A) taken on line A-A'.

In a cathode chamber 4, two gas diffusion electrode units 6a, 6b are attached to a cathode chamber partition 21 through cathode supports 7, and the adjacent gas diffusion electrodes 6a and 6b are provided with a perfluorosulfonic acid resin bonding piece 24 by heat fusion bonding to prevent leakage of electrolyte from a space between both.

FIGS. 4(A), 4(B) and 4(C) are sectional views of embodiments of the bonding piece used to bond gas diffusion electrode units together according to the invention.

For the bonding piece 24, various pieces may be used provided that they have on at least one surface a perfluorosulfonic acid layer, a perfluorosulfonyl fluoride layer or an alkyl ester of perfluorocarboxylic acid layer. Ion-exchange membranes or their precursors may also be used.

FIG. 4(A) is illustrative of a bonding piece 24 formed of a perfluorosulfonic acid layer 25, and FIG. 4(B) depicts a bonding piece 24 formed of perfluorosulfonic acid with a reinforcing fabric 26 included therein to give greater strength thereto.

FIG. 4(C) is illustrative of a bonding piece 24 provided on one surface with a perfluorosulfonic acid layer 25 and on the other surface with a fluororesin layer 27 different from that perfluorosulfonic acid layer.

For the bonding piece having on at least one surface a perfluorosulfonic acid layer, a perfluorosulfonic acid-base ion-exchange membrane, for instance, Naphion 324 (Du Pont) may be used.

For the bonding piece having a perfluorosulfonyl fluoride layer or an alkyl ester of perfluorocarboxylic acid layer, for instance, Flemion 854 (Asahi Glass Co., Ltd.) available as a precursor with no introduction of ion-exchange groups may be used. This precursor has a perfluorosulfonyl fluoride layer on one side and an alkyl ester of perfluorocarboxylic acid layer on the other side.

When the ion-exchange membrane is used as the perfluorosulfonic acid membrane, it is preferable that its surface with a high ion-exchange capacity be bonded to an application surface.

When the perfluorosulfonic acid membrane combines with metal ions such as sodium ions to have a sodium type ion-exchange group, no sufficient bonding properties are obtained. Preferably in this case, the sodium type is converted into an acid type by treatment with hydrochloric acid or the like.

For the perfluorosulfonic acid membrane, a spent ion-exchange membrane already mounted on brine electrolyzers may also be used. Preferably in this case, the spent ion-exchange membrane is treated with an acid such as hydrochloric acid to convert a sodium group into an acid type and various substances contained in the surface or the interior of the ion-exchange membrane are removed by elution. It is also acceptable to remove metal compounds by using a chelating agent in combination with acid treatment.

According to the bonding method of the invention, the bonding piece having a perfluorosulfonic acid layer is placed on the gas diffusion electrode, and then heat fusion bonding means is used to heat under pressure the bonding piece to a temperature higher than its melting temperature. Immediately after heat fusion bonding, the bonding piece is rapidly cooled to give greater strength thereto without having adverse influences on surroundings.

Typically, the bonding piece is heated under pressure at a heating temperature of 270 to 280° C. and a pressure of 2 MPa, and then rapidly cooled down to 80° C. to give the desired strength thereto.

It is noted that the larger the area of a gas diffusion electrode assembly, the larger the area of the portions to be bonded together becomes. In that case, it is preferable to use a heat fusion bonding device that comprises either a large-area heating unit to come in contact with the bonding piece or a small-area heating unit capable of forming a large-area junction.

Figure 5:
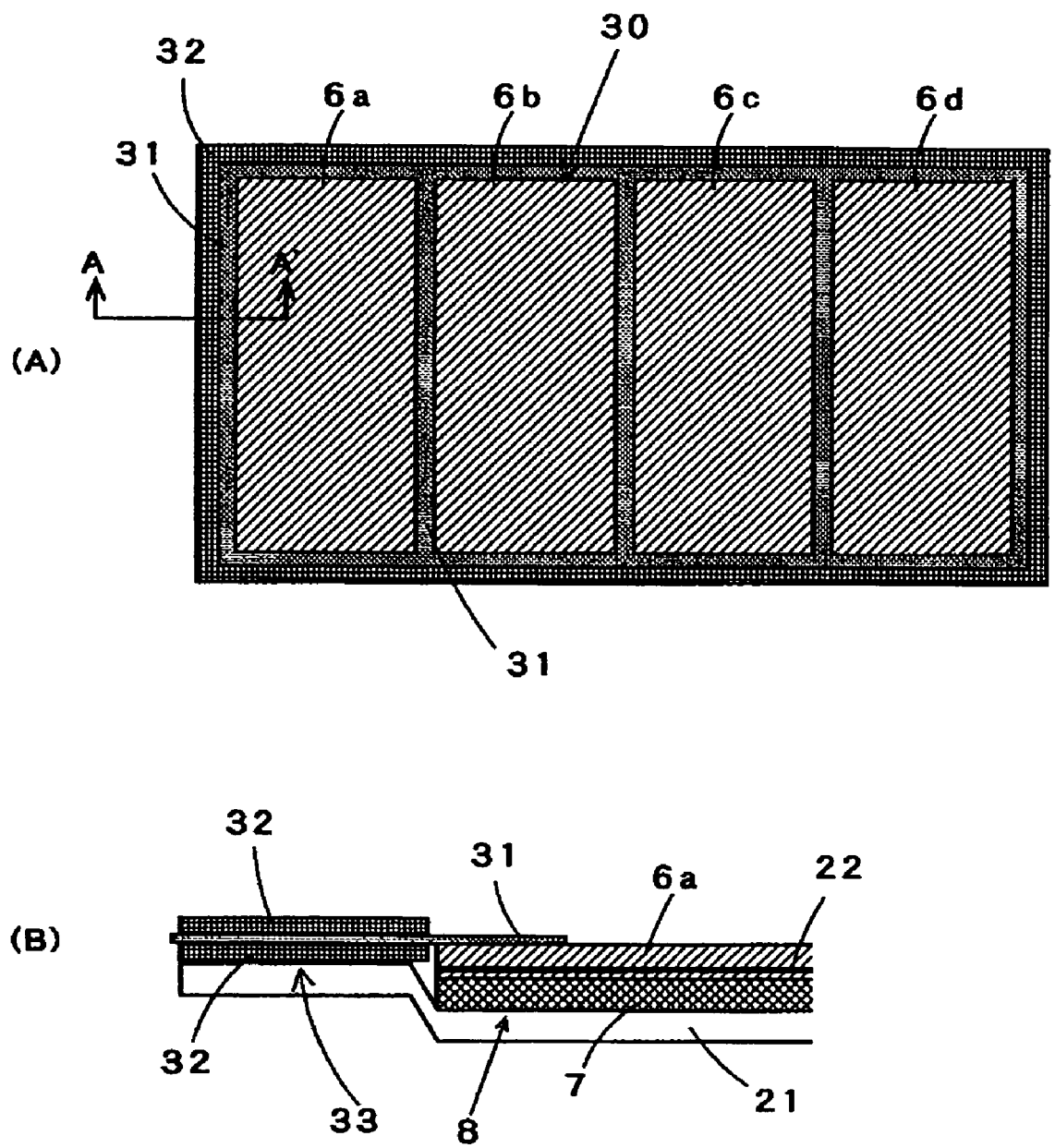

FIGS. 5(A) and 5(B) are illustrative of the cathode chamber in the electrolyzer comprising the gas diffusion electrode assembly according to the invention, as viewed from the cation-exchange membrane side.

FIG. 5(A) is a plan view, and FIG. 5(B) is an enlarged sectional view as taken on line A-A' of FIG. 5(A).

In a cathode chamber 4, four gas diffusion electrode units 6a, 6b, 6c and 6d are attached to a cathode chamber partition 21 via a cathode support 7, with a gas chamber 8 created in the cathode chamber support 7.

To the periphery of each gas diffusion electrode unit 6a, 6b, 6c, 6d, there is heat fusion bonded a frame-form member 31 that is formed of a perfluorosulfonic acid resin membrane and smaller than the electrode surface of each gas diffusion electrode unit, so that each gas diffusion electrode unit is fixed and leakage of electrolyte or gas from a space between the gas diffusion electrode unit and the frame-form member 31 is prevented.

On both peripheral sides of the frame-form member 31, there are located gaskets 32 so that the flange surface 33 of the cathode chamber partition 21 and the ion-exchange membrane to be laminated thereon or the opposite electrode member can be laminated together in sealing relations.

Figure 6:
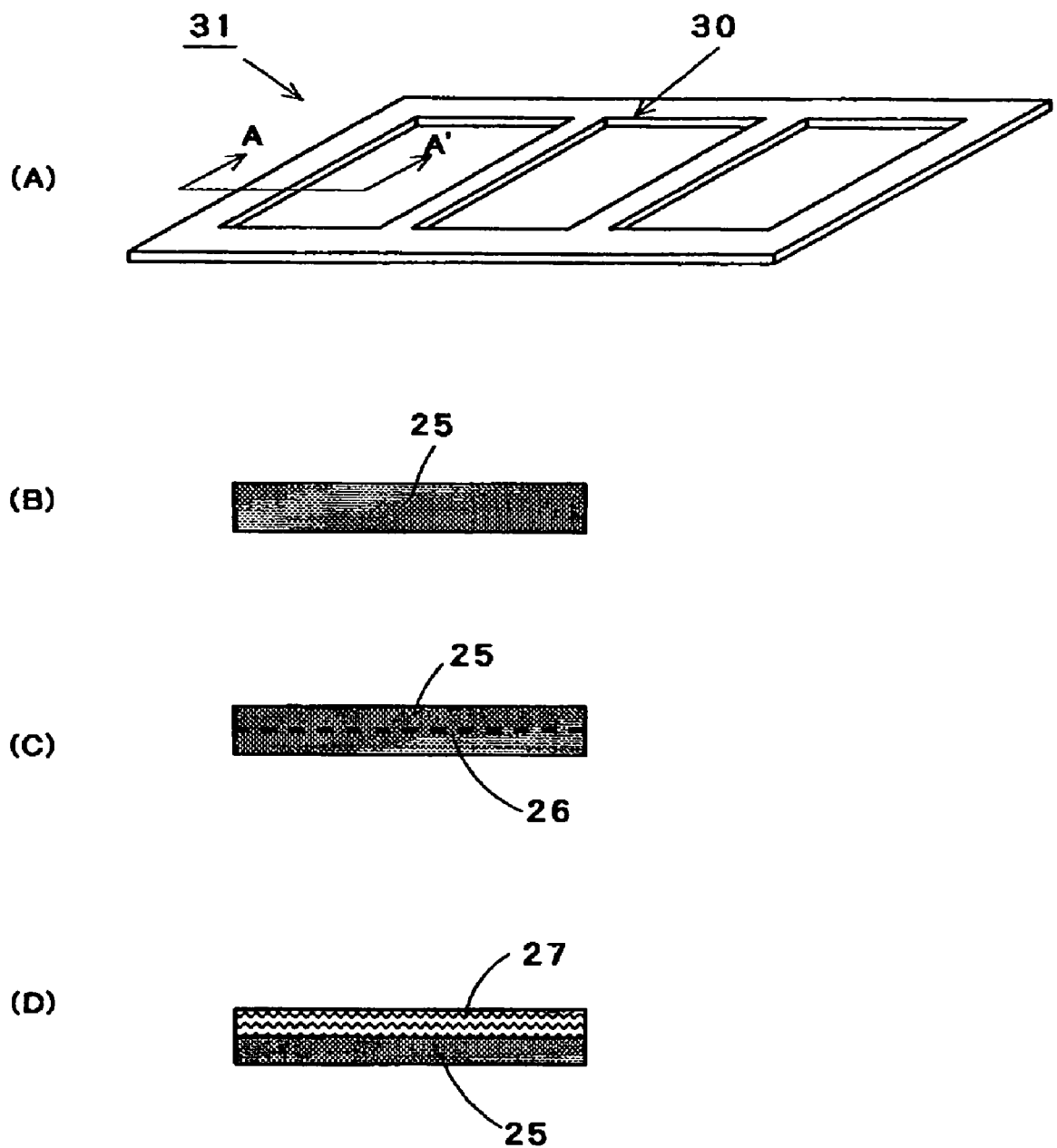

FIGS. 6(A), 6(B), 6(C) and 6(D) are illustrative of the frame-form member according to the invention. FIG. 6(A) is a perspective view, and FIGS. 6(B), 6(C) and 6(D) are sectional views taken on line A-A' of FIG. 6(A) and on scales different from that of FIG. 6(A).

A frame-form member 31 shown in FIG. 6(A) comprises three bonding frames 30.

For the frame-form member 31, a member entirely formed of a perfluorosulfonic acid layer 25 as shown in FIG. 6(B) may be used.

FIG. 6(C) illustrates a frame-form member 31 formed of a perflurosulfonic acid layer 25, with a reinforcing fabric 26 provided therein. This frame-form member 31 has greater strength, and is improved in terms of shape stability as well. It is thus possible to obtain an electrolyzer wherein the gas diffusion electrode units bond to the frame-form member with so high strength that they can be assembled in a stable manner.

FIG. 6(D) shows that a perfluorosulfonic acid layer 25 is formed on one surface of a frame-form member 31, and a fluorocarbon resin layer different from that perfluorosulfonic acid layer is formed on the other surface.

Preferably, the frame-form member is fabricated in a seamless, integral manner by cutting a sheet-form member of large area to a given size, and providing the cut member with bonding frames, each to receive a gas diffusion electrode unit, by means of cutting or punching. The frame-form member may also be fabricated by bonding belt-like members together in a given shape.

Alternatively, it is acceptable that only each bonding frame of the frame-form member is provided with a perfluorosulfonic acid layer, and the rest is not.

The gaskets may be integrally provided on the periphery of the frame-form member.

For the bonding member having on at least one surface a perfluorosulfonic acid layer, a perfluorosulfonic acid-base ion-exchange membrane, for instance, Naphion 324 (Du Pont) may be used.

When the ion-exchange membrane is used as the perfluorosulfonic acid membrane, it is preferable that its surface with a high ion-exchange capacity be bonded to an application surface.

When the perfluorosulfonic acid membrane combines with metal ions such as sodium ions to have a sodium type ion-exchange group or the like, no sufficient bonding property is obtained. Preferably in this case, the sodium type is converted into an acid type by treatment with hydrochloric acid or the like.

For the perfluorosulfonic acid membrane, a spent ion-exchange membrane already mounted on brine electrolyzers may also be used. Preferably in this case, the spent ion-exchange membrane is treated with an acid such as hydrochloric acid to convert a sodium group into an acid type and various substances contained in the surface or the interior of the ion-exchange membrane are removed by elution. It is also acceptable to remove metal compounds by using a chelating agent in combination with acid treatment.

For the bonding member having a perfluorosulfonyl fluoride layer or an alkyl ester of perfluorocarboxylic acid layer, for instance, Flemion 854 (Asahi Glass Co., Ltd.) available as a precursor with no introduction of ion-exchange groups may be used. This precursor has a perfluorosulfonyl fluoride layer on one side and an alkyl ester of perfluorocarboxylic acid layer on the other side.

In the electrolyzer built up of the gas diffusion electrode assembly according to the invention, a plurality of gas diffusion electrode units are positioned at a given spacing. The membrane having a perfluorosulfonic acid layer, a perfluorosulfonyl fluoride layer or an alkyl ester of perfluorocarboxylic acid layer is placed on the gas diffusion electrode assembly. Then, the heat fusion bonding means is used to heat under pressure the membrane to a temperature higher than its melting temperature, so that the membrane is fusion bonded to the assembly. After the heat fusion bonding, the assembly is rapidly cooled so that junctions having high strength can be obtained without having adverse influence to surroundings.

For typical fusion bonding, the assembly is compressed at a heating temperature of 270 to 280° C. and a pressure of 2 MPa, and then rapidly cooled down to 80° C.

Another bonding method for gas diffusion electrode units is particularly characterized by how a sealed portion is formed.

FIGS. 7(A) and 7(B) are illustrative of one embodiment of the bonding method for a gas diffusion electrode assembly in an ion-exchange membrane electrolyzer for electrolysis of an aqueous solution of an alkaline metal chloride, wherein the gas diffusion electrode assembly is attached to a cathode pan that is a cathode collector frame to make an electrical connection between them.

FIG. 7(A) is a plan view of a cathode chamber 4 as viewed from a cation-exchange membrane side, and FIG. 7(B) is a sectional view taken on line A-A' of FIG. 7(A).

In a cathode chamber 4, as shown in FIG. 7(A), two gas diffusion electrode units 6a and 6b are attached to a cathode chamber partition 21 via a cathode support 7. How many gas diffusion electrode units are attached to the cathode chamber partition 7 is determined in dependence on the size of each gas diffusion electrode unit and the cathode chamber partition 21.

Each gas diffusion electrode unit is composed of at least two layers, a reactive layer where electrode reactions occur and a gas supply layer for feeding gas to the reactive layer. The reactive layer is made up of hydrophobic carbon, hydrophilic carbon, a fluororesin such as polytetrafluoroethylene and a catalyst, while the gas supply layer is made up of hydrophobic carbon and a fluororesin such as polytetrafluoroethylene.

In the gas supply layer, there is embedded a collector 22 formed of a network or porous metal member that has good conductivity, for instance, silver or nickel.

The collector 22 formed of a net, an expanded metal or the like embedded in the gas diffusion electrode unit 6a is drawn out of the gas diffusion electrode unit 6a, and spot or otherwise welded to a bonding aid member 23 formed of nickel or the like and attached to the surface of the cathode chamber partition 21 for mechanical fixation and electrical connection.

Then, a sealing material comprising a composition containing an electrically conductive carbonaceous material and a fluororesin is filled in the collector or the like at a junction exposed between the gas diffusion electrode units. Then, the sealing material is thermally treated to form a sealing portion 34.

The electrically conductive carbonaceous material used for the sealing material, for instance, includes electrically conductive carbon black represented by hydrophobic carbon black, hydrophilic carbon black, and their mixture.

The hydrophobic carbon black includes acetylene black (e.g., AB-6 made by Denki Kagaku Kogyo Co., Ltd.), and the hydrophilic carbon black includes acetylene carbon black (e.g., AB-12 made by Denki Kagaku Kogyo Co., Ltd.).

When the hydrophobic carbon black and the hydrophilic carbon black are used in combination, the proportion of them is determined in dependence on the hydrophilicity that the sealing material must have. For instance, the hydrophobic carbon black and the hydrophilic carbon black are used at a weight ratio of 100:0 to 50:50.

The carbonaceous material has an average particle diameter of preferably 0.01 to 10 μm, and more preferably 0.1 to 2 μm.

The fluororesin for the carbonaceous material, for instance, is used in a fine particle or fiber form having an average particle diameter of preferably up to 10 μm. Polytetrafluoroethylene (PTFE), and copolymers or mixtures of tetrafluoroethylene with other monomers or with other polymers may be used, provided that they can give a gas permeable material upon sintering by heat treatment. The fluororesin may be used in a dispersion state in any desired solvent.

The electrically conductive carbonaceous material and the fluororesin are used in such a proportion that the amount of polytetrafluoroethylene is preferably 30 to 100 parts by weight, and more preferably 40 to 70 parts by weight, per 100 parts by weight of the electrically conductive carbonaceous material. When the amount of polytetrafluoroethylene used is less than 30 parts by weight, the resulting sealing properties become worse for lack of strength, although certain electrical conductivity is obtainable. This in turn leads to a possibility of electrolyte leakage that otherwise renders it difficult for the gas diffusion electrode to fulfill its own function. Conversely, at greater than 100 parts by weight, the sealing properties and strength are improved; however, this is not preferable because electrical conductivity and oxygen or other gas permeability drop, making it difficult to the gas diffusion electrode to work well.

Preferably to the sealing material that contains the electrically conductive carbonaceous material and fluororesin, particles of metals such as silver, platinum-group metal, cobalt and manganese or electrically conductive particles of ceramics or the like are added. These electrically conductive particles have an average particle diameter of 0.01 to 10 μm, and may be used in an amount of preferably 5 to 100 parts by weight, and more preferably 20 to 60 parts, by weight per 100 parts by weight of carbon black. Particularly preferred, electrically conductive particles should have a function of such a catalyst as contained in the gas diffusion electrode. Incorporation of electrically conductive particles allows the junction with the gas diffusion electrode assembly to be improved in terms of electrical conductivity. Further, when the particles have a catalytic function, the sealed portion may function as a kind of gas diffusion electrode within a short period of about one day, as is the case with the surrounding gas diffusion electrode unit.

When preparing the sealing material from the electrically conductive carbonaceous material and fluororesin optionally with other electrically conductive particles, it is acceptable that those components are emulsified or dispersed in a solvent such as water or alcohol into a liquid material. If necessary in this case, surfactants such as nonionic ones may be used to improve the dispersion of the electrically conductive carbonaceous material and fluororesin particles. The sealing material composed of a surfactant-containing liquid material may be applied as such to the junction of the gas diffusion electrode assembly. Alternatively, ethanol or other alcohol is added to that liquid material to obtain a liquid with the fluororesin particles flocculated therein, which is then filtrated, dehydrated and dried, followed by extraction of the surfactant in an alcohol. The thus obtained sealing material that contains the electrically conductive carbonaceous material and fluororesin optionally with electrically conductive particles is again dispersed in an alcohol or other solvent, so that the dispersion may be applied to the junction of the gas diffusion electrode.

The sealing material that contains the electrically conductive carbonaceous material and fluororesin optionally with electrically conductive particles may be applied to the junction of the gas diffusion electrode by means of coating, spraying, filling or the like. After application of the sealing material, it is heated as by hot-pressing or ultrasonic irradiation at a temperature lower than the softening point of the fluororesin contained therein, preferably 200 to 500° C., and more preferably 250 to 450° C. This heat treatment is carried out at a pressure of preferably 1 to 10 MPa, and more preferably 2 to 6 MPa.

In this process, the fluororesin contained in the sealing material is sintered to yield a sealed portion formed of an intimate, gas-permeable material that transmits gases such as oxygen, and still does not transmit or leak a liquid such as electrolyte.

In the invention, the sealing material that contains the electrically conductive carbonaceous material and fluororesin optionally with electrically conductive particles should preferably be formed of a material the composition of which is the same as that of the gas diffusion electrodes to be bonded together, because the same layer as the gas supply layer and/or the reactive layer in the gas diffusion electrodes to be bonded together yields preferably on the surface that faces the cathode chamber. This is particularly preferred because the junction of the gas diffusion electrode assembly is just only of reduced electrical resistance but also functions as much the same gas diffusion electrode as the rest of the gas diffusion electrode assembly.

FIGS. 8(A) and 8(B) are illustrative of another bonding method for the gas diffusion electrode assembly according to the invention, wherein the gas diffusion electrode assembly is attached to a cathode pan that is a cathode collector frame.

FIG. 8(A) is a plan view of the gas diffusion electrode assembly attached to an electrolyzer, as viewed from a cation-exchange membrane side, and FIG. 8(B) is an enlarged sectional view taken on line A-A' of FIG. 8(A).

In a cathode chamber 4, two gas diffusion electrode units 6a and 6b are attached to a cathode pan 21 via a cathode support 7, as shown in FIG. 8(A).

In a gas supply layer of the gas diffusion electrode unit 6a, 6b, there is embedded a collector 22 that is made up of a network or porous metal member of silver, nickel or the like, which has improved electrical conductivity.

The collector 22 embedded in the gas diffusion electrode unit 6a and formed of a network, expanded metal or the like is drawn out of the gas diffusion electrode unit 6a, and spot or otherwise welded to a bonding aid member 23 attached to the wall surface of the cathode pan 21 and formed of nickel or the like for mechanical fixation and electrical connection.

Then, a sealing material formed of a composition comprising an electrically conductive carbonaceous material and fluororesin is filled in the collector or the like at a junction exposed between the gas diffusion electrode units, and a surface covering portion 34*a* is integrally formed to cover the surface of the gas diffusion electrode assembly. Finally, the sealing material is heat treated to form a sealed portion 34.

The sealed portion shown in FIG. 8(B) is different from that of FIG. 7(B) in that the sealed portion formed upon heat treatment is swollen over the gas diffusion electrode assembly. The sealed portion of FIG. 8(B) ensures that firmer sealing is achievable in favor of its large bonding area.

FIGS. 9(A) and 9(B) are illustrative of yet another bonding method for the gas diffusion electrode assembly according to the invention, wherein the gas diffusion electrode assembly is attached to a cathode pan that is a cathode collector frame.

FIG. 9(A) is a plan view of the gas diffusion electrode assembly attached to an electrolyzer, as viewed from a cation-exchange membrane side, and FIG. 9(B) is an enlarged sectional view taken on line A-A' of FIG. 9(A).

As shown, gas diffusion electrode units are bonded together on a cathode support attached to the cathode pan that is a cathode collector frame. This method may be applied to repairing a cracking or other defective gas diffusion electrode unit.

In a cathode chamber 4, two gas diffusion electrode units 6*a* and 6*b* are attached to a cathode pan 21 via a cathode support 7.

In a gas supply layer of the gas diffusion electrode unit 6*a*, 6*b*, there is embedded a collector 22 that is made up of a network or porous metal member of silver, nickel or the like, which has improved electrical conductivity. Then, a sealing material formed of a composition comprising an electrically conductive carbonaceous material and fluororesin is filled in the collector or the like exposed between the gas diffusion electrode units. Finally, the sealing material is heat treated to form a sealed portion 34.

According to the method of the invention, the sealing material that covers the surface of the electrode assembly, too, serves to prevent leakage of electrolyte and has electrical conductivity and gas permeability. Thus, even when the sealing material is present on the surface of the gas diffusion electrode assembly, it does not impede the performance of the gas diffusion electrode.

The method of the invention may be used not only to seal up the electrolyzer when the gas diffusion electrode assembly is bonded to the cathode partition but also to previously bond and seal a plurality of gas diffusion electrode units together before they are bonded together for attachment to a large electrolyzer. Alternatively, a defect, if any, in the gas diffusion electrode assembly attached to the electrolyzer can be repaired.

Figure 7:
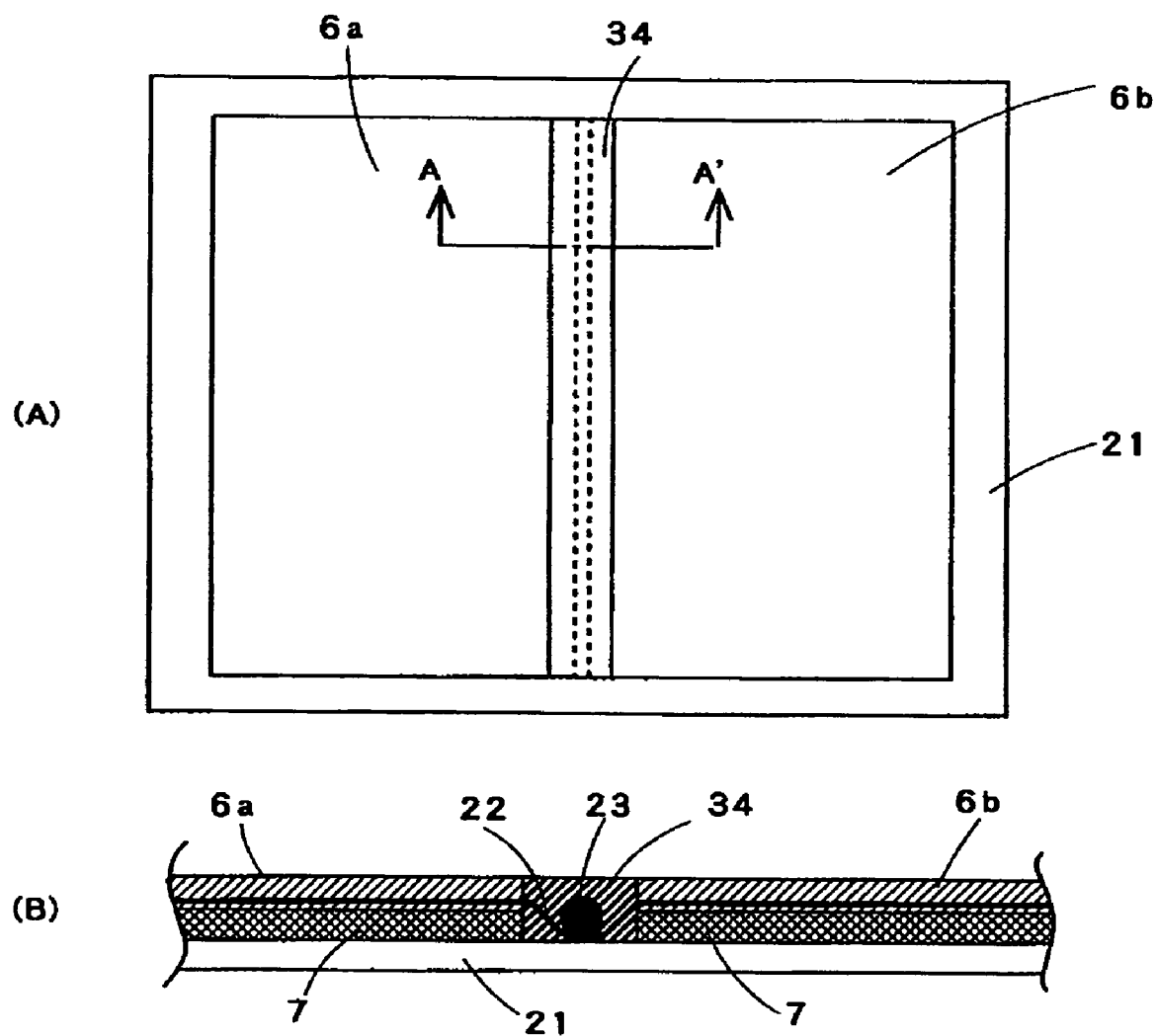
Figure 8:
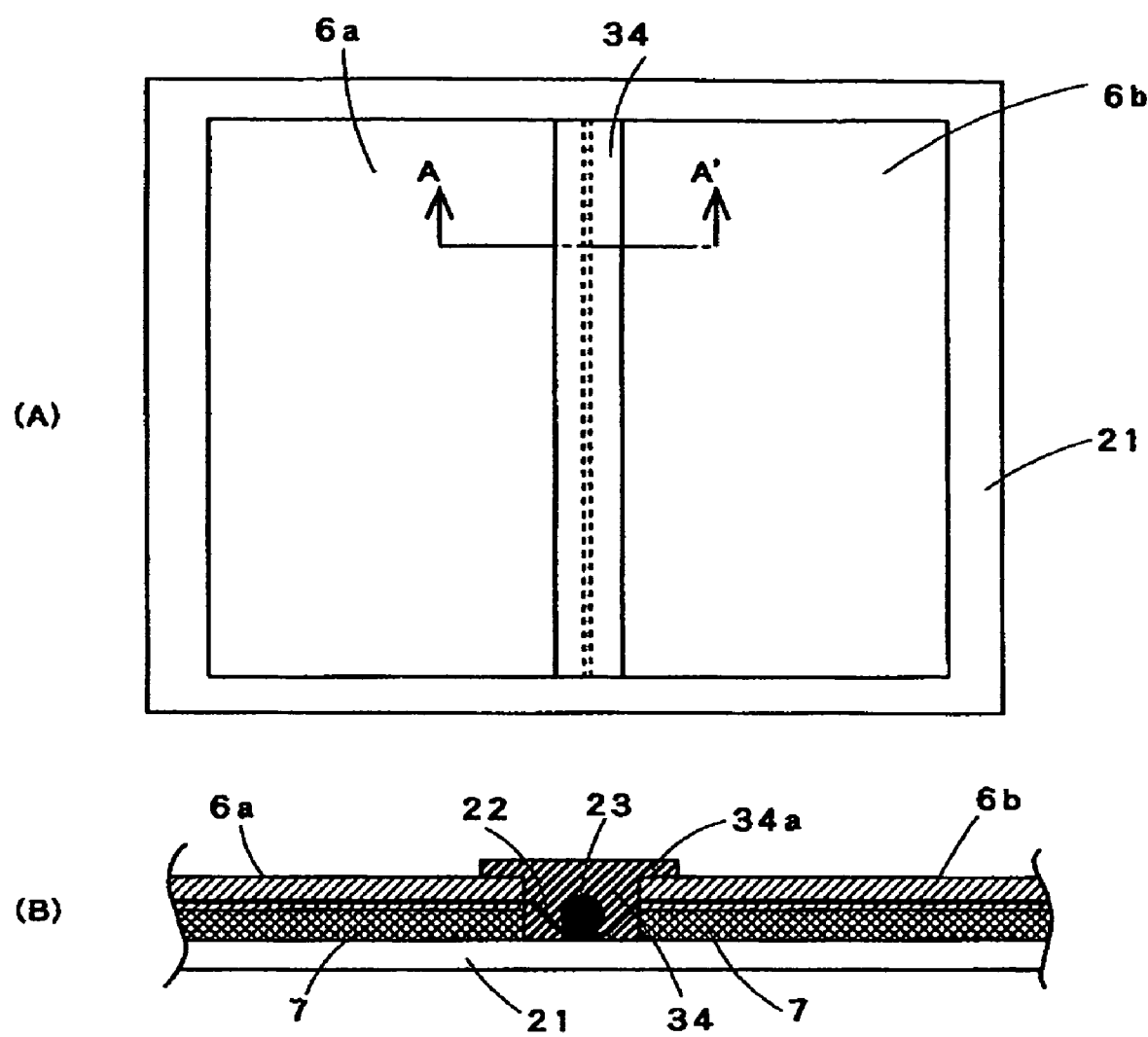

Such a method of previously bonding the gas diffusion electrode units together may be implemented through the embodiments of FIGS. 7, 8 and 9. Collectors exposed on the peripheries of the gas diffusion electrode units are stacked one upon another and bonded as by welding. Then, the sealing material containing an electrically conductive carbonaceous material and fluoro-resin optionally with electrically conductive particles is applied to the junction so that the gas diffusion electrode units can be bonded together in the same manner as explained above.

The sealing method of the invention may be applied to repairing the gas diffusion electrode when it is damaged during or after the operation of the electrolyzer. As is the case with the foregoing, a defective portion of the electrically conductive collector is exposed and the sealing material containing an electrically conductive carbonaceous material, fluororesin, carbon black and polytetraethylene optionally with electrically conductive particles are filled in the defective portion, and then thermally treated.

Another bonding method for the gas diffusion electrode is now explained.

Figure 10:
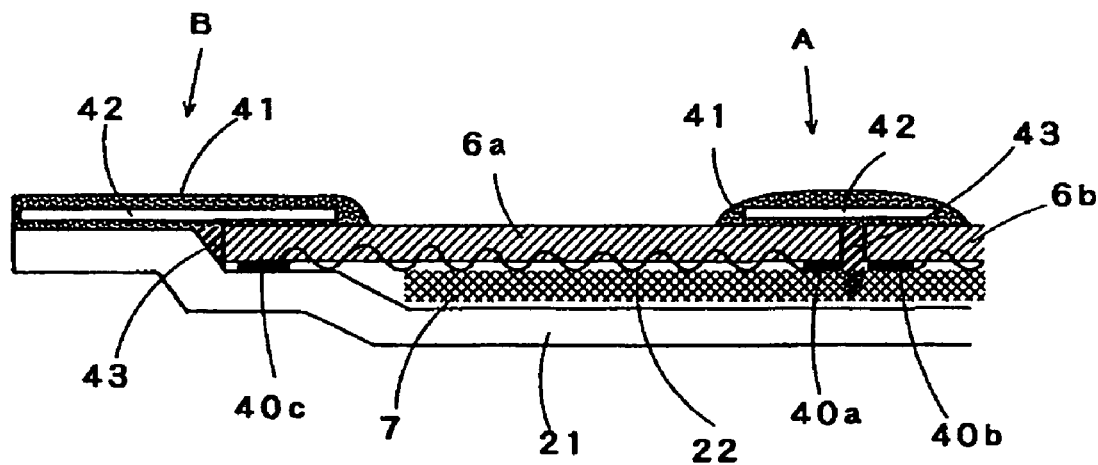
FIG. 10 is illustrative in section of one embodiment of the bonding method for gas diffusion electrodes according to the invention.

FIG. 10 is illustrative in section of one embodiment of the bonding method for gas diffusion electrodes according to the invention, wherein a plurality of gas diffusion electrodes are bonded together for attachment to an electrolyzer.

A gas diffusion electrode unit 6*a*, 6*b* is provided therein with a network, porous or spongy collector 22 formed of a material having good electrical conductivity, for instance, silver or nickel. The collector 22 may be either fully embedded in or partly exposed from the gas diffusion electrode unit. Each gas diffusion electrode unit is the same as already explained with reference to FIGS. 7-9.

In the embodiment shown in FIG. 10, the gas diffusion electrode units 6*a* and 6*b* are adhesively bonded at bonding sites 40*a* and 40*b* to a cathode support 7 attached to a cathode pan 21, as shown by an arrow A, to fix them in place. The collector 22 attached to each gas diffusion electrode unit is in contact with the cathode chamber support 7 with an electrical connection made between them.

An adhesive composition 41 is coated on the portions of the gas diffusion electrode units 6*a* and 6*b* to be bonded together, and a covering sheet 42 is provided over the bonding portions. Then, the adhesive composition is applied on the peripheries of the bonding portions and over the covering sheet 42.

When there is a gap between the gas diffusion electrode units 6*a* and 6*b* upon bonding, a filling agent 43 may be filled therein in such a way as to be flush with the surface of the gas diffusion electrode units.

This prevents deformation of the covering sheet 42 due to a liquid pressure in the catholyte chamber or peeling of the covering sheet 42 from the surfaces of the gas diffusion electrodes 6*a* and 6*b* due to that deformation.

The gas diffusion electrode unit is adhesively bonded at a bonding site 40*c* to a cathode partition, as shown by an arrow B. After the filler 43 is poured in between the gas diffusion electrode and the cathode partition, an adhesive composition 41 is coated on the cathode partition and over the gas diffusion electrode. Subsequently, a covering sheet 42 is placed over them, and another adhesive composition 41 is coated on the covering sheet, so that reliable bonding is achievable.

The covering sheet 42 used herein must be formed of a material resistant to the catholyte. In an electrolyzer for brine electrolysis, the covering sheet 42 comes into contact with a catholyte of strong alkalinity, and so must be formed of a material well resistant to alkali. Preferable materials, for instance, include fluororesins such as polytetrafluoroethylene, rubbers such as ethylenepropylene-diene copolymers (EPDM), ion-exchange membranes, carbon fibers, and thin sheets of alkali-resistant metals such as nickel. Particular preference is given to fluororesins such as polytetrafluoroethylene, which is well bondable to the gas diffusion electrode and of high alkali resistance.

Also, at least the surface of the covering sheet 42 should be microporous. When a sheet material having surface microporosity is used for the covering sheet 42, the adhesive composition 41 readily penetrates its interior, resulting in firm bonding. Preferably, the surface of the covering sheet 42 is made microporous by providing fine asperities to the surface of the covering sheet or by use of a microporous member sheet. The use of the microporous sheet is particularly preferred because greater bonding force is obtainable. For such a microporous sheet, it is preferable to use a microporous fluororesin sheet, for instance, a fluororesin sheet made microporous by cleavage by stretching (GORE-TEX HYPER-SHEET made by JAPAN GORE-TEX INC.).

The covering sheet has a thickness of preferably up to 3 mm, and more preferably 0.1 to 2 mm. A thickness of greater than 3 mm is not preferable because a large spacing must be allowed for between the cathode and the ion-exchange membrane, and liquid resistance increases.

In addition, the covering sheet should preferably be large enough to ensure sufficient bonding force and cause no decrease in the electrode area. Too large a width means that the electrolytic surface of the gas diffusion electrode becomes small, and too small a width means that the bonding force of the sheet material becomes weak. For this reason, the covering sheet width should preferably be in the range of 5 mm to 20 mm.

The adhesive composition 41 used herein is a liquid material in which a synthetic resin having corrosion resistance to electrolytes is dissolved or dispersed in a solvent. Preferably synthetic resins, for instance, include hydrocarbon resins such as polypropylene and polystyrene, fluororesins such as polytetrafluoroethylene and vinylidene fluoride-propylene-tetrafluoroethylene copolymers, polyether-sulfone resins, and epoxy resins such as bisphenol A. In favor of elasticity and chemical resistance, particular preference is given to vinylidene fluoride-propylene-tetrafluoroethylene copolymers, propylene-tetrafluoroethylene copolymers or the like.

When a polymer of vinylidene fluoride is used as the synthetic resin that has corrosion resistance such as alkali resistance, its strength can be increased by crosslinking it to a network structure. It is here understood that insufficient amounts of the crosslinker or partial unreacted sites of the polymer chain would give rise to degradation (probably due to a break in the polymer chain by oxidization) when a gas containing oxygen at high concentrations is used as the feed gas to the gas diffusion electrode. The propylene-tetrafluoroethylene copolymers, because of standing well up to such degradation, are particularly preferred.

Various solvents may be used as the solvent in which those synthetic resins are dissolved or dispersed. With bonding workability for the gas diffusion electrode in mind, however, solvents having reasonable evaporation rates are preferred, because quick-drying ones are difficult to process, and often cause troubles such as an inflation of the sealed surface, which is found when solvent residues are left behind in the resin material of the covering sheet after drying. It is thus desired to use a solvent that has a boiling point at normal pressure of preferably 60 to 200° C., and more preferably 80 to 150° C.

Preferable solvents, for instance, include tetrahydrofuran, acetone, ethyl methyl ketone, toluene, ethyl acetate, butyl acetate, isobutyl acetate, cyclohexanone, and 1,4-dioxane, among which butyl acetate and isobutyl acetate are particularly preferred in favor of smoothness of the finished surface and workability such as working time.

When the adhesive composition comprising a corrosion-resistant synthetic resin is prepared by dissolving or dispersing a synthetic resin having corrosion resistance such as alkali resistance in a solvent, the concentration of the corrosion-resistant synthetic resin in that composition is in the range of preferably 5 to 70% by weight, and more preferably 10 to 40% by weight. A concentration of lower than 5% by weight is not preferable because of the need of coating the adhesive composition several times. A concentration of higher than 70% by weight is again not preferable because viscosity increases to such an extent that the corrosion-resistant synthetic resin is unlikely to go deeply through the electrode junction, failing to produce sufficient sealing properties.

For the gas diffusion electrode bonding using the alkali resistant covering sheet comprising the alkali resistant adhesive composition according to the invention, the adhesive composition is previously coated on the surface of the gas diffusion electrode to be bonded to the covering sheet and the surface of the covering sheet to be bonded to the gas diffusion electrode. Then, both are bonded together followed by application of force thereon. After the application of force, the assembly is dried preferably at room temperature to 200° C. for 1 to 48 hours to volatilize off the solvent in the adhesive composition, so that fully large adhesion strength is achievable. However, it is rather preferable to subject the assembly to predrying at a temperature of room temperature to 50° C. for about 1 to 24 hours and then drying at a temperature of 50 to 200° C. for about 1 to 24 hours, because variations of volatilization of the solvent can be eliminated.

The gas diffusion electrode of the invention is in a sheet form that is obtained by sintering a mixture of a carbonaceous material and fine fluororesin particles, and so is not that much strong. Accordingly, when the covering sheet is bonded to the gas diffusion electrode, it is sometimes likely that the gas diffusion electrode breaks and delaminates internally, failing to produce sufficient sealing properties. To avoid this, the adhesive composition is previously coated on the surface of the gas diffusion electrode to be bonded to the covering sheet and dried, and thereafter the covering sheet is bonded to that surface. In this way, it is possible to prevent internal delamination of the gas diffusion electrode and, hence, increase the adhesion force between the covering sheet and the gas diffusion electrode.

In this case, it is preferable to use an adhesive composition with low resin concentrations, because it penetrates well through the gas diffusion electrode to the vicinity of an electrical conductor therein, thereby ensuring that stronger adhesion force is obtainable. Such an adhesive composition having low resin concentrations should have a resin concetration of preferably 5 to 35% by weight, and more preferably 10 to 20% by weight. In other words, the resin concentration should be lower than that of the adhesive composition used for bonding the covering sheet to the gas diffusion electrode by preferably 2 to 20% by weight, and more preferably 5 to 15% by weight. It is understood that the low-concentration adhesive composition to penetrate through the junction of the gas diffusion electrode is not necessarily the same type as the adhesive composition used for bonding the covering sheet to the gas diffusion electrode; however, it is preferable to use the same type adhesive composition for the purpose of averting penetration of liquid due to a difference in the volume change between adhesive compositions upon thermal expansion, etc.

In cases where the adhesive composition is less likely to penetrate through the gas diffusion electrode and consequently makes less contribution to adhesion force improvements or where an adhesion composition with high resin concentrations is used, it is preferable to provide the surface of the gas diffusion electrode with holes at a suitable distance, because the resin liquid is carried through those holes to the electrical conductor in the gas diffusion electrode or a portion of the cathode support that forms a gas chamber so that adhesion force can be enhanced.

In the invention, the adhesive composition may be previously coated on the surface of the gas diffusion electrode to be bonded to the covering sheet and the surface of the covering sheet to be bonded to the gas diffusion electrode, followed by drying. Then, the adhesive composition may be coated on the covering sheet bonded to the gas diffusion electrode across a width larger than that of the covering sheet thereby covering the covering sheet and its surroundings with the adhesive composition. This ensures that the adhesion force between the covering sheet and the gas diffusion electrode is so increased that the sealing properties of the junction of the gas diffusion electrode can be improved. When a metal sheet is used as the covering sheet, it is preferable to coat its surface with a chemical resistant resin, because generation of hydrogen that is otherwise caused by the cathode action of the metal sheet is prevented.

Figure 11:
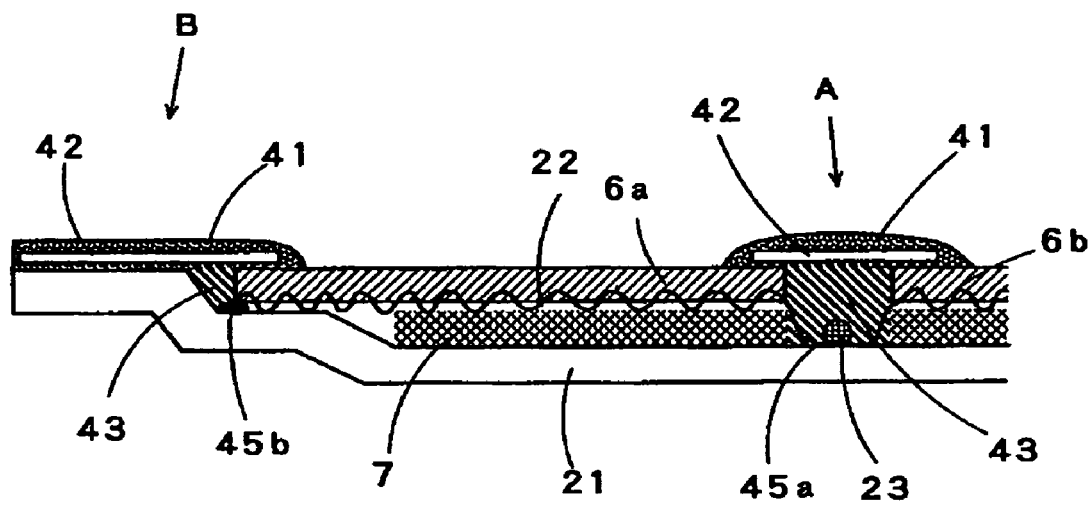
FIG. 11 is illustrative in section of another embodiment of the bonding method for gas diffusion electrodes according to the invention.

FIG. 11 is illustrative in section of another embodiment of the bonding method for the gas diffusion electrode assembly according to the invention, wherein a plurality of gas diffusion electrodes are bonded together for attachment to an electrolyzer.

A gas diffusion electrode unit $6a$, $6b$ is provided therein with a network, porous or spongy collector 22 formed of a material having good electrical conductivity, for instance, silver or nickel. The collector 22 may be either fully embedded in or partly exposed from the gas diffusion electrode unit.

Each gas diffusion electrode unit is the same as already explained with reference to FIGS. 7-10.

In the embodiment shown in FIG. 11, the collector 22 connected to each gas diffusion electrode unit is spot welded at a welding site $45a$ to a bonding aid member 23 of a cathode chamber partition 21 with an electrical connection made between them, as indicated by an arrow A.

An adhesive composition 41 is coated on the portions of the gas diffusion electrode units $6a$ and $6b$ to be bonded together, and a covering sheet 42 is provided over the bonding portions after a filling agent 43 is filled in a gap between the units $6a$ and $6b$ in such a way as to be flush with the surface of the unit. Then, the adhesive composition is applied on the peripheries of the bonding portions and over the covering sheet 42.

This prevents deformation of the covering sheet 42 due to a liquid pressure in the catholyte chamber or peeling of the covering sheet 42 from the surfaces of the gas diffusion electrodes $6a$ and $6b$ due to that deformation.

The collector is welded at a welding site $45b$ to a cathode partition, as shown by a junction B coming in contact with the cathode partition around the gas diffusion electrode unit. After the filling agent 43 is poured in between the gas diffusion electrode and the cathode partition, an adhesive composition 41 is coated on the cathode partition and over the gas diffusion electrode. Subsequently, a covering sheet 42 is placed over them, and another adhesive composition 41 is coated on the covering sheet, so that reliable bonding is achievable.

Figure 12:
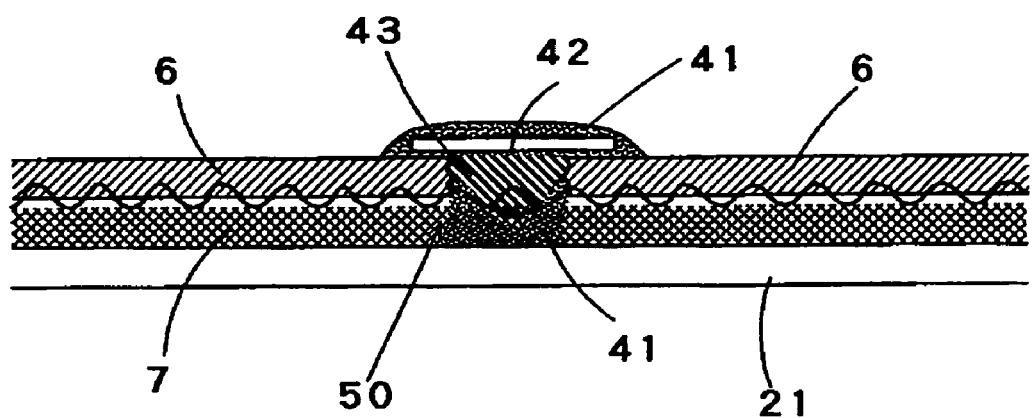
FIG. 12 is illustrative in section of yet another embodiment of the bonding method for gas diffusion electrodes according to the invention.

FIG. 12 is illustrative in section of the gas diffusion electrode bonding and sealing method that is used for repairing a gas diffusion electrode.

A gas diffusion electrode is often damaged and perforated during its assembling to an electrolyzer or during operation of the electrolyzer. Such a perforated gas diffusion electrode can be repaired by the gas diffusion electrode bonding and sealing method of the invention.

After an adhesive composition 41 is poured in a defective portion 50 in a gas diffusion electrode 6, a filling agent 43 is poured in that defective portion 50 in such a way that the surface of the gas diffusion electrode 6 on the liquid chamber side is flush with that on the filling agent surface side. Thereafter, an adhesive composition 41 is coated on the filler 43 and on a junction portion of the gas diffusion electrode 6 around it, and a covering sheet 42 is placed over the junction portion, following which an adhesive composition 41 is covered on the surroundings of the junction portion and the covering sheet 42, thereby ensuring stable operation of the electrolyzer.

The present invention is now explained with reference to inventive and comparative examples.

EXAMPLE 1-1

Preparation of Gas Diffusion Electorode

A gas diffusion electrode was prepared by stacking a gas supply layer and a reactive layer one upon another.

(I) Preparation for Raw Material for Gas Supply Layer

Five (5) kg of hydrophobic carbon black (AB-6 made by Denki Kagaku Kogyo Co., Ltd. with an average particle diameter of 50 nm) were dispersed in an aqueous solution of surfactant (12.5 L of a 20% by mass aqueous solution of Tryton X-100 in 90 L of water), and 3.72 L of a polytetrafluoroethylene dispersion having a solid content of 3.35 kg were dispersed in and mixed with the resultant dispersion. Thereafter, 76 kg of ethanol were added to the resultant mixture to break up polytetrafluoroethlene dispersion micelles for flocculation.

Then, filtration, dehydration and drying were carried out to prepare 8.2 kg of a forming material in a pellet form.

(II) Preparation of Raw Material for Reactive Layer

Naught point eight five (0.85) kg of hydrophobic carbon black (AB-6 made by Denki Kagaku Kogyo Co., Ltd.) and 2 kg of hydrophilic carbon black (AB-12 made by Denki Kagaku Kogyou Co., Ltd.) were dispersed in an aqueous solution of surfactant (12.5 L of a 20% by mass aqueous solution of Tryton X-100 in 90 L of water), followed by dispersion of 1 kg of fine silver particles (having an average particle diameter of 0.3 μm). One point five seven (1.57) L of a polytetrafluoroethylene dispersion having a solid content of 1.42 kg were dispersed in and mixed with the resultant dispersion, and 72 kg of ethanol were then added thereto to break up polytetrafluoroethylene dispersion micelles for flocculation.

Then, filtration, dehydration and drying were carried out to prepare 5.5 kg of a forming material in a pellet form.

(III) Forming Process

The obtained raw material for the gas supply layer was pulverized, and milled with water for slurry preparation, and the slurry was coated on an expanded metal formed of silver (SW 1 mm, LW 2 mm and ST 0.18 mm with a thickness of 0.3 mm). On the other hand, the raw material for the reactive layer was pulverized, and milled with ethanol for slurry preparation. This slurry was coated on the first-mentioned slurry and dried, followed by removal of the surfactant by extraction with ethanol.

Thereafter, the assembly was further dried, and fusion bonded under pressure at a temperature 360° C. and a pressure of 4.9 MPa to obtain a 210 mm by 53 mm gas diffusion electrode having a thickness of 1 mm.

Bonding Process for Gas Diffusion Electrodes

The obtained gas diffusion electrodes were placed in a cathode chamber partition forming a cathode chamber at a spacing of 4 mm via a cathode support, and metal gauzes of silver drawn out of the gas diffusion electrodes were welded to the cathode chamber using a bonding aid member.

Then, an acid type member having a width of 15 mm and a length 210 mm and formed of a perfluorosulfonic acid type ion-exchange member (Naphion 324 made by Du Pont) was used as a bonding piece. With the bonding piece placed at its surface having a higher ion-exchange capacity on the surface of the gas diffusion electrode assembly, a heat fusion bonding machine was used to sequentially bond the gas diffusion electrodes at a pressure of 2 MPa and a temperature of 280° C. for 60 seconds.

With water filled in the gas diffusion electrode assembly, water leakage testing was carried out. As a result, the junctions were found to be free from water leakage. With a forced peel of the bonding piece, the gas diffusion electrodes fissured before the junctions peeled off, indicating that the strength of the junctions was on a sufficient level.

An electrolyzer set up with the thus bonded gas diffusion electrode assembly was run for 40 days. The electrolyzer could be operated in a stable manner with no fluid leakage from the junctions at all.

EXAMPLE 1-2

Instead of the perfluorosulfonic acid type ion-exchange membrane used in Example 1-1, an ion-exchange membrane precursor with no introduction of ion-exchange groups therein (Flemion F854 made by Asahi Glass Co., Ltd.) was used as the bonding piece. The heat fusion bonding machine was used to sequentially bond the perfluorosulfonyl fluoride layer surface to the surface of the gas diffusion electrode assembly at a pressure of 2 MPa and a temperature of 270° C. for 60 seconds. Junction layers having strength similar to that of the perfluorosulfonic acid type ion-exchange membrane could be formed.

EXAMPLE 1-3

Instead of the perfluorosulfonic acid type ion-exchange membrane used in Example 1-1, an ion-exchange membrane precursor with no introduction of ion-exchange groups therein (Flemion F854 made by Asahi Glass Co., Ltd.) was used as the bonding piece. The heat fusion bonding machine was used to sequentially bond the alkyl ester of perfluorocarboxylic acid layer surface to the surface of the gas diffusion electrode assembly at a pressure of 2 MPa and a temperature of 270° C. for 60 seconds. Junction layers having strength similar to that of the perfluorosulfonic acid type ion-exchange membrane could be formed.

COMPARATIVE EXAMPLE 1-1

Instead of the bonding piece of the perfluorosulfonic acid used in Example 1-1, a bonding piece formed of a tetrafluoroethylene-hexafluoropropylene copolymer (FEP) film and having a width of 15 mm, a length of 210 mm and a thickness of 250 µm (made by Nippon Bulker Co., Ltd.) was used for bonding at a temperature of 350° C. and a pressure of 2 MPa. On the FEP side of the junction, there was a dent having a bottom on the gas diffusion electrode side of the junction. Measurement of a section of the junction on a flat board indicated that there was a height difference of 1.5 mm between the widthwise end of the junction and the center of the dent. Even with some force given to the junction, asperities could not be leveled off.

EXAMPLE 2-1

Preparation of Gas Diffusion Electrode

A gas diffusion electrode was prepared by stacking a gas supply layer and a reactive layer one upon another.

(I) Preparation for Raw Material for Gas Supply Layer

Five (5) kg of hydrophobic carbon black (AB-6 made by Denki Kagaku Kogyo Co., Ltd. with an average particle diameter of 50 nm) were dispersed in an aqueous solution of surfactant (12.5 L of a 20% by mass aqueous solution of Tryton X-100 in 90 L of water), and 3.72 L of a polytetrafluoroethylene dispersion having a solid content of 3.35 kg were dispersed in and mixed with the resultant dispersion. Thereafter, 76 kg of ethanol were added to the resultant mixture to break up polytetrafluoroethlene dispersion micelles for flocculation.

Then, filtration, dehydration and drying were carried out to prepare 8.2 kg of a forming material in a pellet form.

(II) Preparation of Raw Material for Reactive Layer

Naught point eight five (0.85) kg of hydrophobic carbon black (AB-6 made by Denki Kagaku Kogyo Co., Ltd.) and 2 kg of hydrophilic carbon black (AB-12 made by Denki Kagaku Kogyou Co., Ltd.) were dispersed in an aqueous solution of surfactant (12.5 L of a 20% by mass aqueous solution of Tryton X-100 in 90 L of water), followed by dispersion of 1 kg of fine silver particles (having an average particle diameter of 0.3 µm). One point five seven (1.57) L of a polytetrafluoroethylene dispersion having a solid content of 1.42 kg were dispersed in and mixed with the resultant dispersion, and 72 kg of ethanol were then added thereto to break up polytetrafluoroethylene dispersion micelles for flocculation.

Then, filtration, dehydration and drying were carried out to prepare 5.5 kg of a forming material in a pellet form.

(III) Forming Process

The obtained raw material for the gas supply layer was pulverized, and milled with water for slurry preparation, and the slurry was coated on an expanded metal formed of silver (SW 1 mm, LW 2 mm and ST 0.18 mm with a thickness of 0.3 mm). On the other hand, the raw material for the reactive layer was pulverized, and milled with ethanol for slurry preparation. This slurry was coated on the first-mentioned slurry and dried, followed by removal of the surfactant by extraction with ethanol.

Thereafter, the assembly was further dried, and fusion bonded under pressure at a temperature of 360° C. and a pressure of 4.9 MPa for 60 seconds to obtain a gas diffusion electrode having a thickness of 1 mm.

Gas diffusion electrode units of 80 mm by 35 mm were cut out of the obtained gas diffusion electrode.

Bonding Process

Two openings of 56 mm by 235 mm were provided at a spacing of 10 mm in the center of a 96 mm by 96 mm cation-exchange membrane comprising perfluorosulfonic acid.

A cathode support and gas diffusion electrode units were placed at given sites of a cathode partition, and a frame-form member was placed with the gas diffusion electrode units positioned in the respective bonding frames, and the gas diffusion electrode units were positioned at the openings in the surface of the perfluorosulfonic acid membrane. Then, a heat fusion bonding machine was used to sequentially bond the perfluorosulfonic acid membrane to the peripheries of the gas diffusion electrode units at a pressure of 2 MPa and a temperature of 280° C. for 60 seconds.

With water poured at 25° C. in the frame-form member with the gas diffusion electrode units received therein from the reactive layer side, no water leakage was found at a pressure of up to 30 MPa (gauge pressure).

EXAMPLE 3-1

Preparation of Gas Diffusion Electrode

A mixture of hydrophobic carbon black and a polytetrafluoroethylene dispersion was coated on a 30-mesh silver mesh, which was then sintered to prepare a sheet form of gas diffusion electrode.

The gas diffusion electrode had a thickness of 1 mm with a 0.1 mm thick reactive layer, and the gas supply layer consisted of 60% by mass of hydrophobic carbon black and 40% by mass of polytetrafluoroethylene while the reactive layer consisted of 50% by mass of carbon black, 30% by mass of PTFE and 20% by mass of a 0.3 mm silver particle catalyst.

Preparation of Sealing Material

Five (5) kg of hydrophobic carbon black (AB-6 made by Denki Kagaku Kogyo Co., Ltd.) were absorbed in an aqueous solution of surfactant (12.5 L of a 20% aqueous solution of Tryton in 90 L of water) thereby dispersing the carbon black to about 1 μm in the solution. Three point seven two (3.72) L of a polytetrafluoroethylene dispersion having a solid PTFE content of 3.35 kg were added to and mixed with the resultant dispersion, and 76 kg of ethanol were charged therein for flocculation. The ensuing carbon black-polytetrafluoroethylene mixed solution was filtrated through a filter, dehydrated, and dried, followed by extraction of the surfactant with ethanol.

Assembling of Electrolyzer

As shown in FIG. 7, a gas diffusion electrode had a collector exposed on its periphery, and the collector was spot welded to a cathode partition using an auxiliary electrical conductor made of nickel.

A filling material was prepared by adding 3 ml of ethanol to 1 g of the above sealing material. This filling material was coated on and filled in a gap of 8 mm at a junction of the collector of the gas diffusion electrode with a cathode pan. Then, the gap was sealed up by hot-press sintering at 360° C. and 5 MPa for 1 minute.

COMPARATIVE EXAMPLE 3-1

Sealing was carried out as in Example 3-1 with the exception that a 100 μm thick, 17 mm wide sealing material made of a tetrafluoroethylene-hexafluoropropylene copolymer (FEP) was placed on a portion where an electrically conductive collector exposed from the gas diffusion electrode was spot welded to a cathode partition from above a nickel round rod, and bonding was carried out by hot-press sintering at 320° C. and 2 MPa for 1 minute.

Comparative Testing

Using the gas diffusion electrodes obtained in Example 3-1 and Comparative Example 3-1, testing was performed according to the following electrolyzer specifications and running conditions. The results are plotted in FIGS. 13 and 14.

Figure 13:
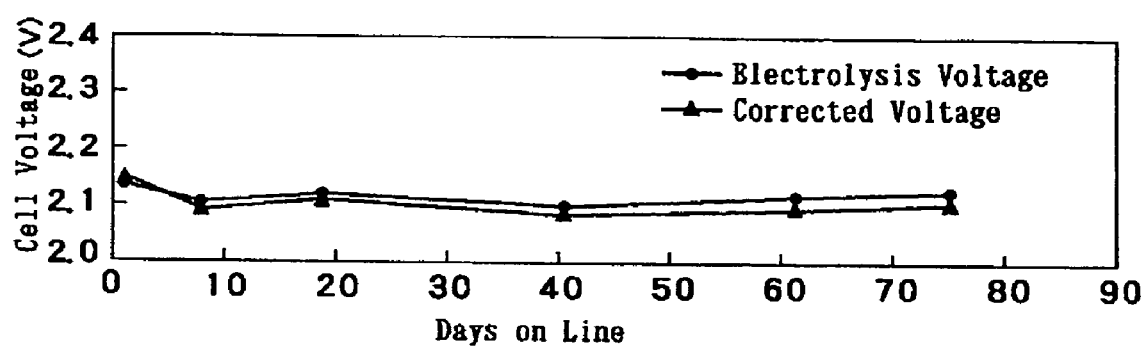
FIG. 13 is illustrative of the electrolysis voltage performance of one example of the invention.
Figure 14:
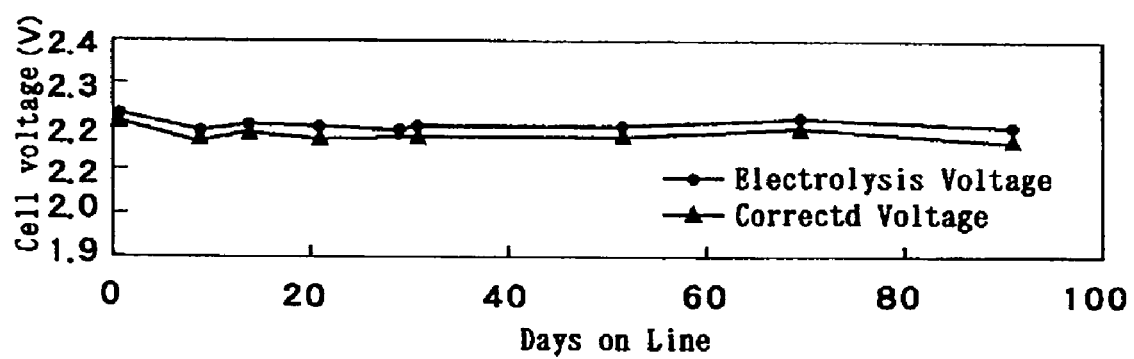
FIG. 14 is illustrative of the electrolysis voltage performance of a comparative example.

Both the electrolyzers had no sign of electrolyte leakage, and had good sealing properties. However, as shown in FIGS. 13 and 14, the electrolyzer of Comparative Example 3-1 had an electrolysis voltage of 2.2 V, whereas the electrolyzer of Example 3-1 had an electrolysis voltage of as low as 2.1 V.

Size of Electrolytic Reaction Surface of Electrolyzer:
    100 mm×100 mm

Feed Current: 30 A

Anode: DSE made by Pelmereck Electrode Co., Ltd.

Ion-exchange Membrane: Aciplex F4203 (made by Asahi Chemicals, Co., Ltd.)

Composition of Gas Feed to Gas Diffusion Electrode:
    Oxygen Content: 99.99% by volume Running Conditions:
    Temperature: 90° C.
    Aqueous solution of Sodium Hydroxide at Electrolyzer Outlet: 32% by mass
    Brine Concentration at Electrolzyer Outlet: 210 g/L
    Where actual temperatures and concentrations deviated from the above target values, correction was made at 10 mV/° C.-16 mV/sodium hydroxide concentration (% by mass) relative to the reference value. In FIGS. 13 and 14 are set forth electrolysis voltages with and without the above correction.

EXAMPLE 4-1

Brine was electrolyzed using an ion-exchange membrane electrolyzer wherein a plurality of gas diffusion electrode units were bonded together, and electrically connected to a cathode partition.

Bonding Process for Gas Diffusion Electrodes

A mixture of carbon black and a polytetrafluoroethylene dispersion was coated on a silver mesh electrical conductor, which was then sintered to prepare a sheet form of gas diffusion electrode unit. A gas supply layer consisted of 60% by mass of carbon black and 40% by mass of PTFE, and a reactive layer consisted of 50% by mass of carbon black, 30% by mass of PTFE and 20% by mass of a silver catalyst having an average particle diameter of 0.3 μm. The gas diffusion electrode had a thickness of 1 mm, 0.1 mm of which was that of the reactive layer.

As shown in FIG. 11, an electrical conductor was exposed from around the gas diffusion electrode units to be bonded together. The end of the electrical conductor exposed was put over the cathode partition, which was then spot welded to the cathode partition. A cathode support to form a gas chamber was spot welded on the cathode partition.

Then, a filling agent comprising EPDM rubber (Type No. LV-40 made by Showa Rubber Co., Ltd.) was filled and embedded in the junctions of the gas diffusing electrode units, so that the surfaces of the junctions were flush with the surface of the gas diffusion electrode units on the reactive layer side.

Then, an adhesive composition A obtained by dissolving fluororubber in isoamyl acetate having a resin concentration of 14% by mass (Eight Seal made by Taihei Kasei Co., Ltd.) was coated on the surfaces of the junctions of the gas diffusion electrodes to be bonded together, and allowed to penetrate through the junctions, followed by drying. In addition, an adhesive composition having a resin content of 24% by mass was coated on the above surface of the junction, and a fluororesin sheet (Goatex Hyper Sheet made by Japan Goatex Co., Ltd.) was bonded thereon. It is here noted that the adhesive composition A having a resin concentration of 24% by mass had previously been coated on the surface of the fluororesin sheet to be bonded.

After the fluororesin sheet and the surface of the gas diffusion electrode to be bonded had been dried, the adhesive composition A having a resin concentration of 24% by mass was again fluororesin sheet over an area larger than that of the fluororesin sheet by 2 mm×2 mm, followed by drying.

Ion-Exchange Membrane Electrolyzer Used

Reactive Surface Size of Gas Diffusion Electrode:

1,200 mm×620 mm

Anode: DSE-JP130 made by Pelmereck Electrode Co., Ltd.

Ion-exchange Membrane: Aciplex F-4203 (made by Asahi Chemicals, Co., Ltd.)

Cathode Support for Forming Gas Chamber: Corrugate Mesh (made by Keida Graiting) (0.4Ni 0.4M-25) surface treated by silver electroplating at 10 μm thickness Running Conditions for Ion-Exchange Membrane Electrolyzer Current Density: 3 kA/m$^2$
Temperature: 85° C.
Concentration of Generated Sodium Hydroxide: 32% by Mass Results of Running of Electrolyzer Under the above conditions, the ion-exchange membrane electrolzyer was run continuously for 100 days, and still could be operated in a stable manner with no leakage from the junctions of the gas diffusion electrodes. In the meantime, an electrolysis voltage was maintained at 2.13 V, indicating satisfactory performance.

What we claim is:

1. A gas diffusion electrode assembly comprising a plurality of gas diffusion electrodes, wherein adjacent gas diffusion electrodes are bonded together by a bonding piece, wherein said bonding piece has on at least one surface a layer selected from the group consisting of: a perfluorosulfonic acid compound layer, a perfluorosulfonyl fluoride compound layer or an alkyl ester of a perfluorocarboxylic acid compound layer and said bonding piece is bonded by heat fusion to mutually unite said adjacent gas diffusion electrodes into a plurality of unit gas diffusion electrodes located on a porous cathode support with said surface of said bonding piece on said adjacent gas electrodes.

2. The gas diffusion electrode assembly according to claim 1, wherein the perfluorosulfonic acid compound layer, or a perfluorosulfonyl fluoride compound layer comprises an acid type ion-exchange group.

* * * * *